United States Patent
Takahashi et al.

(10) Patent No.: US 11,932,323 B2
(45) Date of Patent: Mar. 19, 2024

(54) SPEED REDUCER, DRIVE UNIT AND STEERING ASSISTING DEVICE

(71) Applicant: NABTESCO CORPORATION, Tokyo (JP)

(72) Inventors: Masahiro Takahashi, Tokyo (JP); Yuto Nakai, Tokyo (JP)

(73) Assignee: NABTESCO CORPORATION, Tokyo (JP)

( * ) Notice: Subject to any disclaimer, the term of this patent is extended or adjusted under 35 U.S.C. 154(b) by 269 days.

(21) Appl. No.: 17/411,179

(22) Filed: Aug. 25, 2021

(65) Prior Publication Data

US 2022/0063708 A1   Mar. 3, 2022

(30) Foreign Application Priority Data

Aug. 31, 2020  (JP) ................. 2020-146278

(51) Int. Cl.
  *B62D 5/04*  (2006.01)
(52) U.S. Cl.
  CPC ......... *B62D 5/0403* (2013.01); *B62D 5/0409* (2013.01)
(58) Field of Classification Search
  CPC ................ B62D 5/0403; B62D 5/0409
  See application file for complete search history.

(56) References Cited

U.S. PATENT DOCUMENTS

| 7,811,193 B2 * | 10/2010 | Nakamura | F16H 1/46 |
| | | | 475/179 |
| 2019/0162281 A1 * | 5/2019 | Nakamura | F16H 1/32 |

FOREIGN PATENT DOCUMENTS

| CN | 107023642 A | * | 8/2017 | ........... B62D 5/0421 |
| JP | 2006183871 A | * | 7/2006 | |
| JP | 2012056037 A | * | 3/2012 | |
| JP | 2013-035475 A | | 2/2013 | |

* cited by examiner

*Primary Examiner* — Jacob D Knutson
(74) *Attorney, Agent, or Firm* — Pillsbury Winthrop Shaw Pittman, LLP

(57) ABSTRACT

A speed reducer according to one aspect of the present disclosure includes an input rotating body, a speed reducing mechanism unit, and a tubular case. The speed reducer is rotatable when acted upon by power fed from a drive device. The speed reducing mechanism unit reduces a speed of rotation of the input rotating body. The tubular case covers an outer surface of the speed reducing mechanism unit and rotates when acted upon by speed-reduced power from the speed reducing mechanism unit. An output arm is formed integrally with the tubular case, the output arm extending radially outward from an outer peripheral surface of the tubular case and configured to transmit a manipulating force to an outside.

4 Claims, 18 Drawing Sheets

SPEED REDUCER, DRIVE UNIT AND STEERING ASSISTING DEVICE

CROSS-REFERENCE TO RELATED APPLICATIONS

This application is based on and claims the benefit of priority from Japanese Patent Application Serial No. 2020-146278 (filed on Aug. 31, 2020), the contents of which are hereby incorporated by reference in their entirety.

TECHNICAL FIELD

The present disclosure relates to a speed reducer, a drive unit and a steering assisting device.

BACKGROUND

Vehicles include devices constituting the steering system. A known one of such devices is a steering assisting device using power produced by hydraulic pressure and electric motors for assisting a driver's steering. The steering assisting device includes a steering mechanism for steering wheels in accordance with manipulation of a steering unit (steering wheel), and a drive unit for outputting to the steering mechanism assisting power determined by the steering power applied to the steering unit. (See, for example, Japanese Patent Application Publication No. 2013-35475)

The drive unit used in the above-described steering assisting device include a drive device such as an electric motor and a speed reducer for decelerating the output from the drive device. The speed reducer includes an input rotating body being rotatable when acted upon by power fed from the drive device, a speed reducing mechanism unit for reducing the speed of the rotation of the input rotating body, and an output rotating body being rotatable when acted upon by the speed-reduced power produced by the speed reducing mechanism unit. The speed reducer is configured to transmit the rotation of the output rotating body to the steering mechanism.

In a known speed reducer used in the steering assisting device, the output rotating body is formed of a tubular case disposed on the radially outer side of the speed reducing mechanism unit. This speed reducer has an output arm mounted to the tubular case with bolts. The output arm transmits a manipulating force to the steering mechanism.

Since the output arm is fixed to the tubular case with bolts, it is difficult to manage the fastening forces of the bolts. Therefore, when the fastening forces of the bolts are varied, it is difficult to manage the torque transmitted to the steering mechanism.

To overcome this problem, the output arm may be fastened and fixed with a plurality of bolts to a fixing flange provided on the outer periphery of the tubular case. However, this technique requires a thick flange to be provided on the outer periphery of the tubular case for bolt fastening. Further, the thick flange needs to have bolt insertion holes and screw holes formed therein. Accordingly, the speed reducer as a whole unfavorably tends to have a large size and a large weight, and in addition, the amount of production work is increased.

SUMMARY

Aspects of the present disclosure provide a speed reducer, a drive unit and a steering assisting device capable of outputting a stable torque through the output arm to the outside without enlargement of the size or weight of the device as a whole or increase of the amount of production work.

(1) A speed reducer according to one aspect of the present disclosure includes: an input rotating body rotatable when acted upon by power fed from a drive device; a speed reducing mechanism unit for reducing a speed of rotation of the input rotating body; and a tubular case covering an outer surface of the speed reducing mechanism unit and configured to rotate when acted upon by speed-reduced power from the speed reducing mechanism unit. An output arm is formed integrally with the tubular case, the output arm extending radially outward from an outer peripheral surface of the tubular case and configured to transmit a manipulating force to an outside.

(2) The speed reducer may further include a base block rotatably supporting the input rotating body and the tubular case, wherein the base block includes a fixture flange, the fixture flange projecting radially outward from a position adjacent to one end portion of the tubular case in an axial direction and fixed to another member, and wherein the output arm extends radially outward from another end portion of the tubular case in the axial direction.

(3) A drive unit according to one aspect of the present disclosure includes: a drive device for outputting rotational power; and a speed reducer for reducing a speed of input rotation when acted upon by power fed from the drive device. The speed reducer includes: an input rotating body rotatable when acted upon by power fed from the drive device; a speed reducing mechanism unit for reducing a speed of rotation of the input rotating body; and a tubular case covering an outer surface of the speed reducing mechanism unit and configured to rotate when acted upon by speed-reduced power from the speed reducing mechanism unit. An output arm is formed integrally with the tubular case, the output arm extending radially outward from an outer peripheral surface of the tubular case and configured to transmit a manipulating force to an outside.

(4) A steering assisting device according to one aspect of the present disclosure includes: a drive device for outputting rotational power; a speed reducer for reducing a speed of input rotation when acted upon by power fed from the drive device; and a steering mechanism operable when acted upon by speed-reduced power from the speed reducer. The speed reducer includes: an input rotating body rotatable when acted upon by power fed from the drive device; a speed reducing mechanism unit for reducing a speed of rotation of the input rotating body; and a tubular case covering an outer surface of the speed reducing mechanism unit and configured to rotate when acted upon by speed-reduced power from the speed reducing mechanism unit. An output arm is formed integrally with the tubular case, the output arm extending radially outward from an outer peripheral surface of the tubular case and configured to transmit a manipulating force to the steering mechanism.

In the speed reducer described above, the output arm extending radially outward from the outer peripheral surface of the tubular case is integrated with the tubular case. Accordingly, it is possible to output a stable torque through the output arm to the outside without enlargement of the size or weight of the device as a whole or increase of the amount of production work.

DETAILED DESCRIPTION OF THE INVENTION

The embodiments of the present disclosure will be hereinafter described with reference to the drawings.

<Steering Assisting Device>

Figure 1:
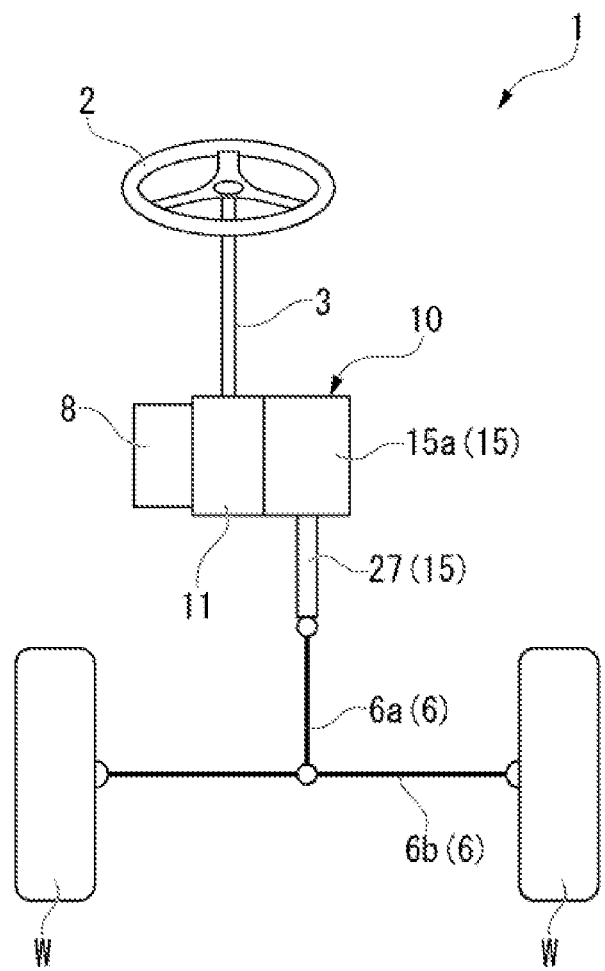
FIG. 1 schematically shows a configuration of a steering assisting device according to an embodiment.

FIG. 1 schematically shows the configuration of a steering assisting device 1 for a vehicle employing a drive unit 10 relating to an embodiment of the present invention. The steering assisting device 1 includes a steering wheel 2, a steering shaft 3, the drive unit 10 also serving as a steering transmitting unit, and a steering mechanism 6 configured to be steered through the drive unit 10. The steering wheel 2 is provided in front of the driver's seat in the vehicle and is rotatable by the driver. The steering shaft 3 is integrally coupled with the steering wheel 2 and rotatable integrally with the steering wheel 2.

The drive unit 10 includes a motor 8 or a drive device provided for assisting steering and a speed reducer 11 (111, 211, 311, 411, 511, 611, 711) for reducing the speed of the rotation of the motor 8 and transmitting the speed-reduced rotation to the steering mechanism 6. The drive unit 10 is coupled to the lower end of the steering shaft 3. The steering torque transmitted from the steering wheel 2 to the steering shaft 3 is input into the input unit of the speed reducer 11 via a gear mechanism, not shown. In the speed reducer 11, the input unit combines together the input steering torque and the assisting torque from the motor 8 and transmits the combined torque to a speed reducing mechanism unit.

Accordingly, the result of combining together the steering torque and assisting torque is reduced in speed with a predetermined reduction ratio and output to the output unit side (the steering mechanism 6 side) in the speed reducer 11.

The steering shaft 3 has a torque sensor (not shown) provided thereon. The torque detected by the torque sensor is input into a controller (not shown) for controlling the motor 8. The controller is configured to control the output from the motor 8 based on a signal input from the torque sensor. The driver manipulating the steering wheel 2 is assisted by the torque provided by the motor 8, which is controlled by the controller.

The output unit in the speed reducer 11 has an output arm 27 (described below) provided. The distal end of the output arm 27 is coupled with the steering mechanism 6 of the vehicle. The steering mechanism 6 includes a manipulation arm 6a and a tie rod 6b. The manipulation arm 6a receives a manipulating force from the output arm 27, and the tie rod 6b steers the front wheels W of the vehicle in response to the manipulation of the manipulating arm 6a. The following describes speed reducers 11, 111, 211, 311, 411, 511, 611, and 711 relating to respective embodiments can be used in the steering assisting device 1 shown in FIG. 1.

First Embodiment

Figure 2:
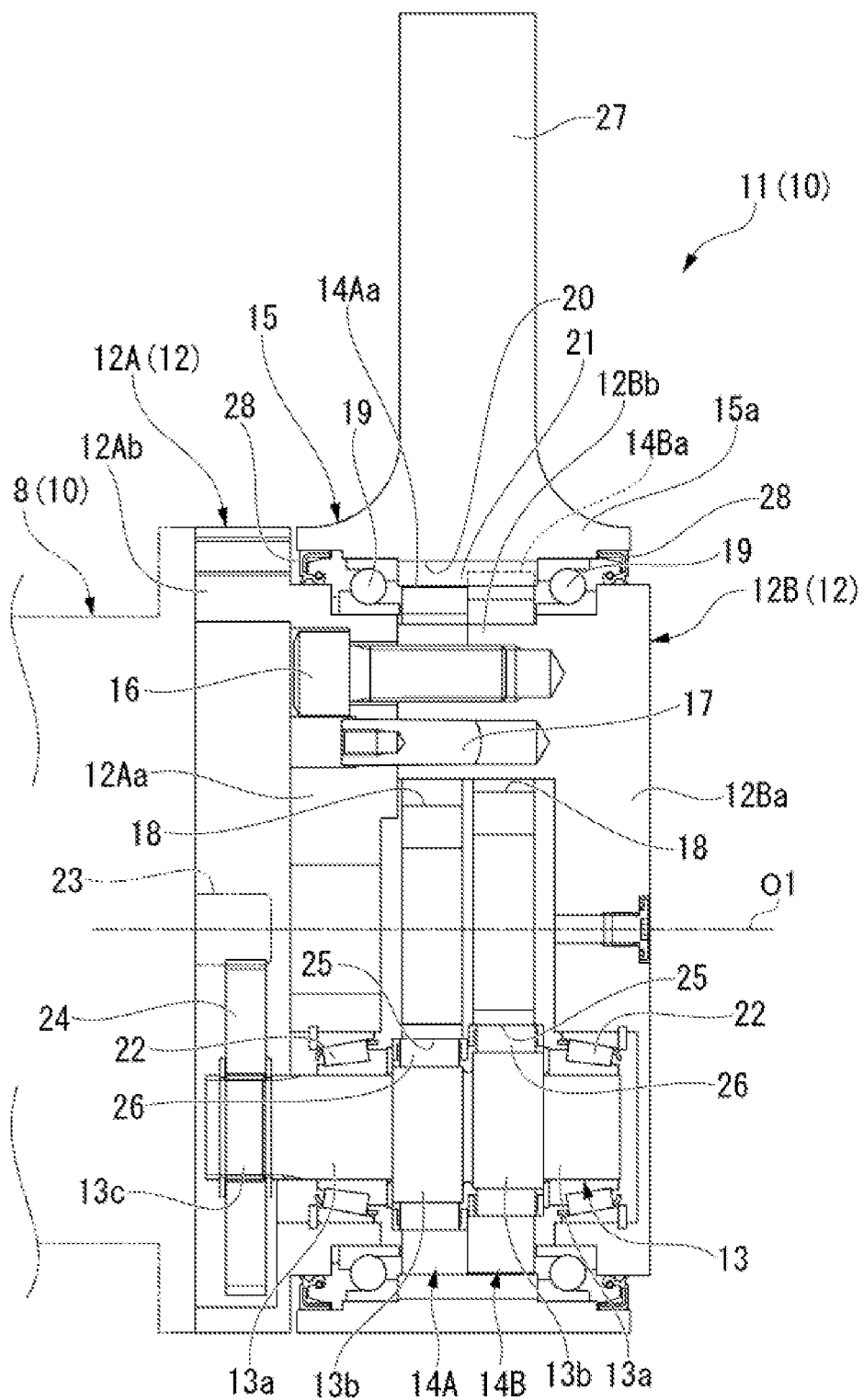
FIG. 2 is a longitudinal sectional view of a speed reducer according to a first embodiment.

FIG. 2 is a longitudinal sectional view of a speed reducer 11 according to a first embodiment. The speed reducer 11 includes a base block 12 fixedly provided in a vehicle, a plurality of (for example, three) crankshafts 13 (input rotating body) rotatably supported on the base block 12, a first oscillating gear 14A and a second oscillating gear 14B oscillatorily rotatable together with two eccentric rotating portions 13b of each crankshaft 13, and a tubular case 15 rotatably supported on the outer peripheral surface of the base block 12 such that the tubular case 15 covers the radially outer surface of the first and second oscillating gears 14A and 14B.

The base block 12 is, as a whole, shaped like a circular cylinder having a small axial length. In the following description, for the sake of convenience, the term "an axial direction" refers to the direction extending along a central axis O1 of the base block 12, and the term "a radial direction" refers to a radiating direction centered on the central axis O1. Furthermore, the term "the axially inner side" may refer to the inwardly facing side of an object in the axial direction, and the term "the axially outer side" may refer to the opposite side of the object. These terms are similarly used in the description of the other embodiments.

The base block 12 includes a first base block 12A positioned on one side in the axial direction and a second base block 12B positioned on the other side in the axial direction. The first base block 12A includes a substrate portion 12Aa and a fixture flange 12Ab. The substrate portion 12Aa is shaped like a disc, and the fixture flange 12Ab is bent in a crank-like manner from the outer peripheral portion of the substrate portion 12Aa toward the axially outer side and then projects toward the radially outer side. The fixture flange 12Ab receives a case of the motor 8 fastened and fixed thereto. The second base block 12B includes a substrate portion 12Ba and a plurality of coupling columns 12Bb. The substrate portion 12Ba is shaped like a disc and has substantially the same outer diameter as the substrate portion 12Aa of the first base block 12A. The coupling columns 12Bb extend from the end surface of the substrate portion 12Ba toward the first base block 12A. On the end surface of the substrate portion 12Ba, the plurality of (for example, three) coupling columns 12Bb are concentrically arranged and centered on the central axis O1.

The second base block 12B is assembled with the first base block 12A by fixedly fastening the coupling columns 12Bb to the first base block 12A via bolts 16, with the end surfaces of the coupling columns 12Bb being pressed against the end surface of the substrate portion 12Aa of the first base block 12A. The reference number 17 in FIG. 2 indicates an alignment pin for aligning the first base block 12A with the coupling columns 12Bb before the first and second base blocks 12A and 12B are fastened together via the bolts 16.

An axial gap is maintained between the substrate portion 12Aa of the first base block 12A and the substrate portion 12Ba of the second base block 12B. In this gap, the first oscillating gear 12A and the second oscillating gear 14B are arranged. The first and second oscillating gears 14A and 14B each have a plurality of relief holes 18 formed therein, which are penetrated by the coupling columns 12Bb of the second base block 12B. The relief holes are sufficiently larger than the outer diameter of the coupling columns 12Bb, so that the coupling columns 12Bb do not prevent the oscillatory rotation of the first and second oscillating gears 14A and 14B.

The tubular case 15 extends over the outer peripheral surface of the substrate portion 12Aa of the first base block 12A and the outer peripheral surface of the substrate portion 12Ba of the second base block 12B. The edges of the tubular case 15 on both sides in the axial direction are rotatably supported, via bearings 19, on the outer periphery of the substrate portion 12Aa of the first base block 12A and the outer periphery of the substrate portion 12Ba of the second base block 12B, respectively. In the inner peripheral surface of the axially middle region of the tubular case 15 (the region facing the outer peripheral surface of the first and second oscillating gears 14A and 14B), a plurality of pin grooves 20 are formed and extend in a direction parallel to the central axis O1 of the first and second base blocks 12A and 12B. Each of the pin grooves 20 receives an inner tooth pin 21 therein. The inner tooth pins 21 have a substantially cylindrical shape and are received in a rotatable manner. The plurality of inner tooth pins 21 attached to the inner peripheral surface of the tubular case 15 face the outer peripheral surfaces of the first and second oscillating gears 14A and 14B.

The first and second oscillating gears 14A and 14B have an outer diameter slightly smaller than the inner diameter of the tubular case 15. On the outer peripheral surface of the first oscillating gear 14A, outer teeth 14Aa are formed such that the outer teeth 14Aa contact in a meshing manner with the inner tooth pins 21 disposed on the inner peripheral surface of the tubular case 15. On the outer peripheral surface of the second oscillating gear 14B, outer teeth 14Ba are formed such that the outer teeth 14Ba contact in a meshing manner with the inner tooth pins 21 disposed on the inner peripheral surface of the tubular case 15. The respective numbers of the outer teeth 14Aa and 14Ba are slightly smaller than the number of the inner tooth pins 21 (the pin grooves 20) (by one, for example).

The crankshafts 13 are arranged on the same circumference centered at the central axis O1 of the first and second base blocks 12A and 12B. Each of the crankshafts 13 is rotatably supported on the first and second base blocks 12A and 12B via the bearings 22. Each crankshaft 13 includes a pair of journals 13a separated from each other in the axial direction. The journals 13a are supported on the bearings 22. Each crankshaft 13 has the above-mentioned two eccentric rotating portions 13b provided between the journals 13a.

On the end of the crankshaft 13 on the one side in the axial direction (the side where the motor 8 is positioned), a gear attachment portion 13c is formed adjacently to the journal 13a. The gear attachment portion 13c protrudes axially outward beyond the substrate portion 12Aa of the first base block 12A. The gear attachment portion 13c has a crank gear 24 attached thereto, meshing with an output gear 23 of the motor 8.

The crank gear 24 meshes with the gear of the gear mechanism (not shown) formed on the steering shaft 3 (see FIG. 1). The manipulating force produced by the driver to manipulate the steering wheel 2 is input into the crankshafts 13 via the crank gear 24 and, at the same time, the assisting force produced by the motor 8 is input into the crankshafts 13 via the crank gear 24.

The first and second oscillating gears 14A and 14B have supporting holes 25 formed therein, which are penetrated by the eccentric rotating portions 13b of the crankshafts 13. An eccentric portion bearing 26 (cylindrical rolling bearing) is provided in each of the supporting holes 25 formed in the first and second oscillating gears 14A and 14B. In this way, the first oscillating gear 14A and the second oscillating gear 14B are supported on the associated eccentric rotating portions 13b of the crankshaft 13 via the eccentric portion bearings 26.

In the speed reducer 11, as the crankshafts 13 rotate in one direction when acted upon by torque fed from the steering shaft 3 and motor 8, the eccentric rotating portions 13b of the crankshafts 13 revolve in the same direction with a predetermined radius. As the eccentric rotating portions 13b revolve, the first and second oscillating gears 14A and 14B rotate oscillatorily in the same direction with the same radius. Simultaneously, the outer teeth 14Aa, 14Ba of the first and second oscillating gears 14A and 14B contact in a meshing manner with the inner tooth pins 21 retained on the inner peripheral surface of the tubular case 15.

In the speed reducer 11, the respective numbers of the outer teeth 14Aa and 14Ba of the first and second oscillating gears 14A and 14B are slightly smaller than the number of the inner tooth pins 21 on the tubular case body portion 15a. Accordingly, while the first and second oscillating gears 14A and 14B oscillate once, the outer teeth 14Aa and 14Ba of the first and second oscillating gears 14A and 14B move the tubular case 15 at a predetermined pitch in the same direction. As a result, the rotation of the crankshafts 13 is reduced in speed at a predetermined reduction ratio and then output in the form of the rotation of the tubular case 15. In the present embodiment, the crankshafts 13 constitute the input rotating body of the speed reducer 11. The first and second oscillating gears 14A and 14B constitute a speed reducing mechanism unit of the speed reducer 11, when combined with the inner tooth pins 21 and the like.

The tubular case 15 includes a case body portion 15a and an output arm 27. The case body portion 15a covers the radially outer surface of the speed reducing mechanism unit and is rotatably supported on the base block 12 via the bearings 19. The output arm 27 extends radially outward from the outer peripheral surface of the case body portion 15a. In the embodiment, the output arm 27 extends radially outward from the substantially axially middle portion of the case body portion 15a. The output arm 27 is integrated with the case body portion 15a by welding or the like.

The reference numeral 28 in FIG. 2 denotes seal members tightly closing the gap between the first base block 12A (the substrate portion 12Aa) and the case body portion 15a and the gap between the second base block 12B (the substrate portion 12Ba) and the case body portion 15a, respectively.

The space delineated by the tubular case 15 and the base block 12, where the speed reducing mechanism unit is placed, is filled with a lubricant liquid for lubricating mechanical parts such as the speed reducing mechanism unit.

As described above, in the speed reducer 11 of the embodiment, the output arm 27 extending radially outward from the outer peripheral surface of the tubular case 15 is integrated with the tubular case 15. Therefore, it is possible to output a stable torque through the output arm 27 to the outside without enlargement of the size or weight of the speed reducer 11 as a whole or increase of the amount of production work, unlike the case where a fixing flange is provided on the tubular case 15 and an output arm formed separately is bolted to this flange (the conventional structure).

Also, in the drive unit 10 including the speed reducer 11 of the embodiment, the output side of the speed reducer 11 can have a small weight, and thus the power consumption in the motor 8 can be reduced.

Further, in the steering assisting device 1 including the drive unit 10 of the embodiment, the output side of the speed reducer 11 can have a small size and a small weight. Thus, the degree of freedom in vehicle arrangement can be increased, and the weight of the vehicle can be reduced.

Figure 3:
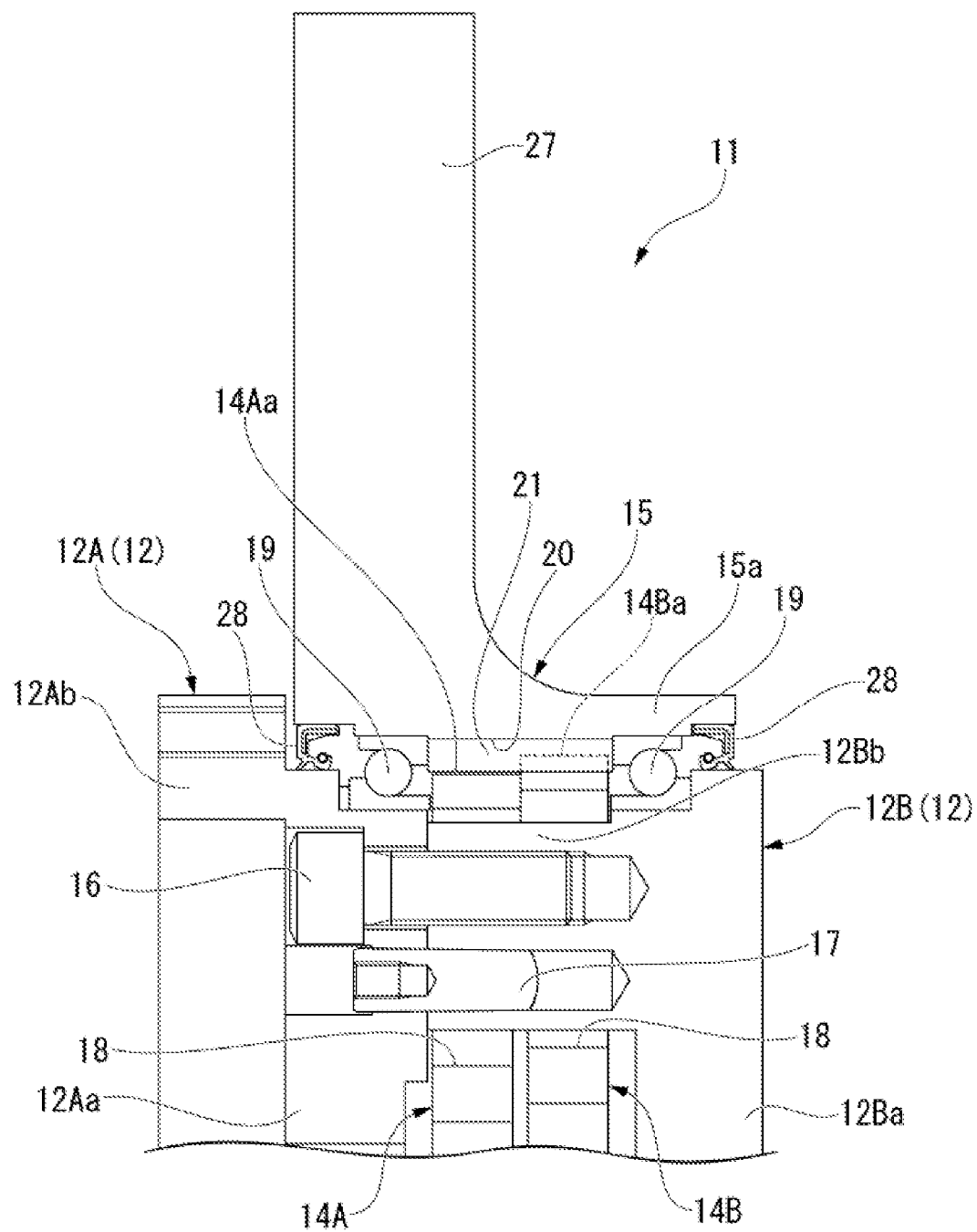
FIG. 3 is a sectional view of a modification of the speed reducer according to the first embodiment.

In the speed reducer 11 shown in FIG. 2, the output arm 27 extends radially outward from the substantially axially middle portion of the tubular case 15, but this is not limitative. For example, as in the modification shown in FIG. 3, the output arm 27 may extend radially outward from one axial end portion of the tubular case 15. In the modification shown in FIG. 3, the output arm 27 extends radially outward from the end portion of the tubular case 15 adjacent to the fixture flange 12Ab projecting radially outward from the substrate portion 12Aa of the first base block 12A.

Figure 4:
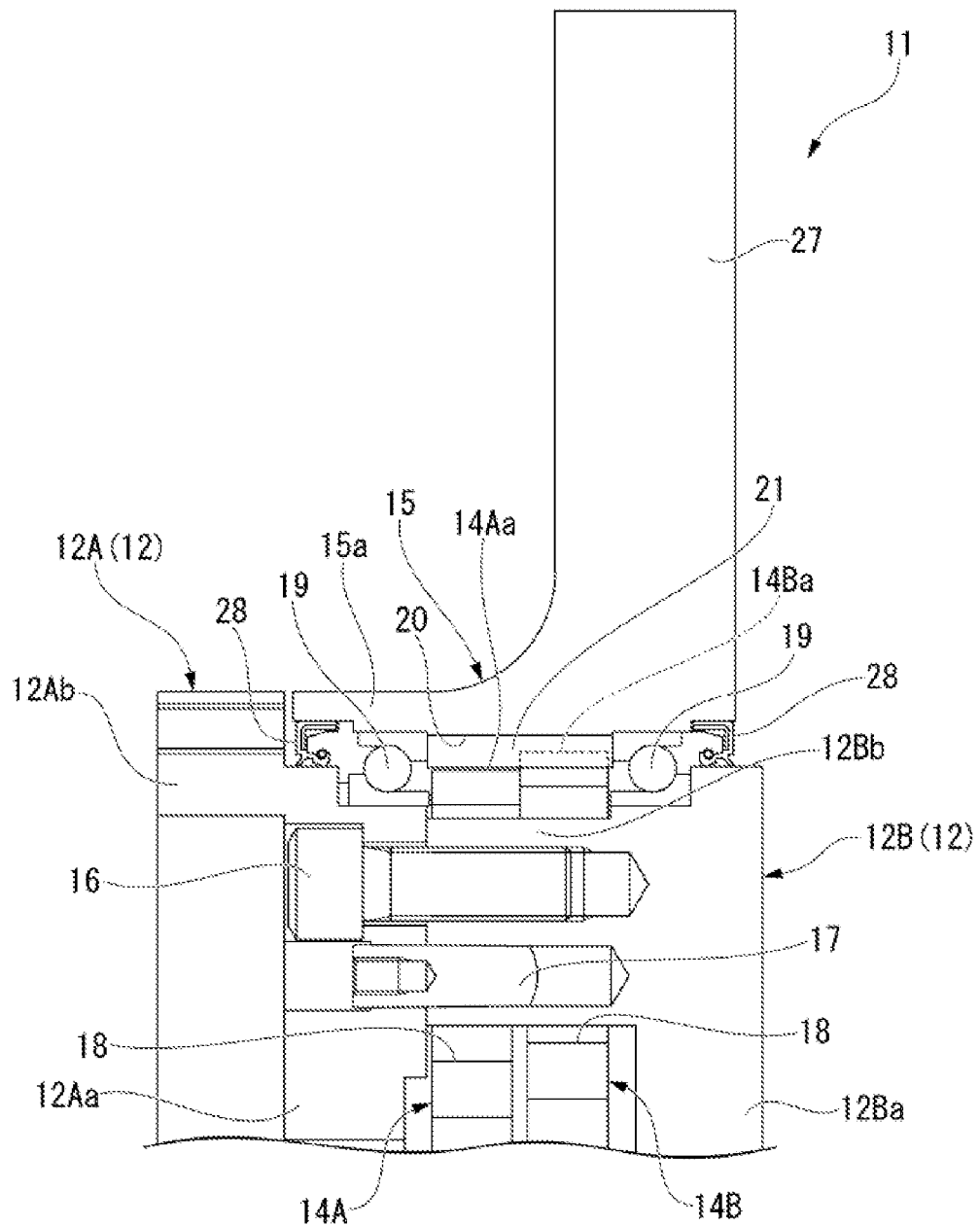
FIG. 4 is a sectional view of another modification of the speed reducer according to the first embodiment.

Further, as in the modification shown in FIG. 4, the output arm 27 may extend radially outward from the other axial end portion of the tubular case 15 (the end portion axially opposite to the fixture flange 12Ab). In this configuration, the output arm 27 extends radially outward from the end portion of the tubular case 15 axially opposite to the fixture flange 12Ab. Therefore, the output arm 27 is less prone to obstruct the assembling work when the motor 8 or other members are assembled to the speed reducer 11. Accordingly, this configuration increases the efficiency of the assembling work.

In the following description of the embodiments, the same elements as those in the first embodiment are denoted by the same reference numerals.

Second Embodiment

Figure 5:
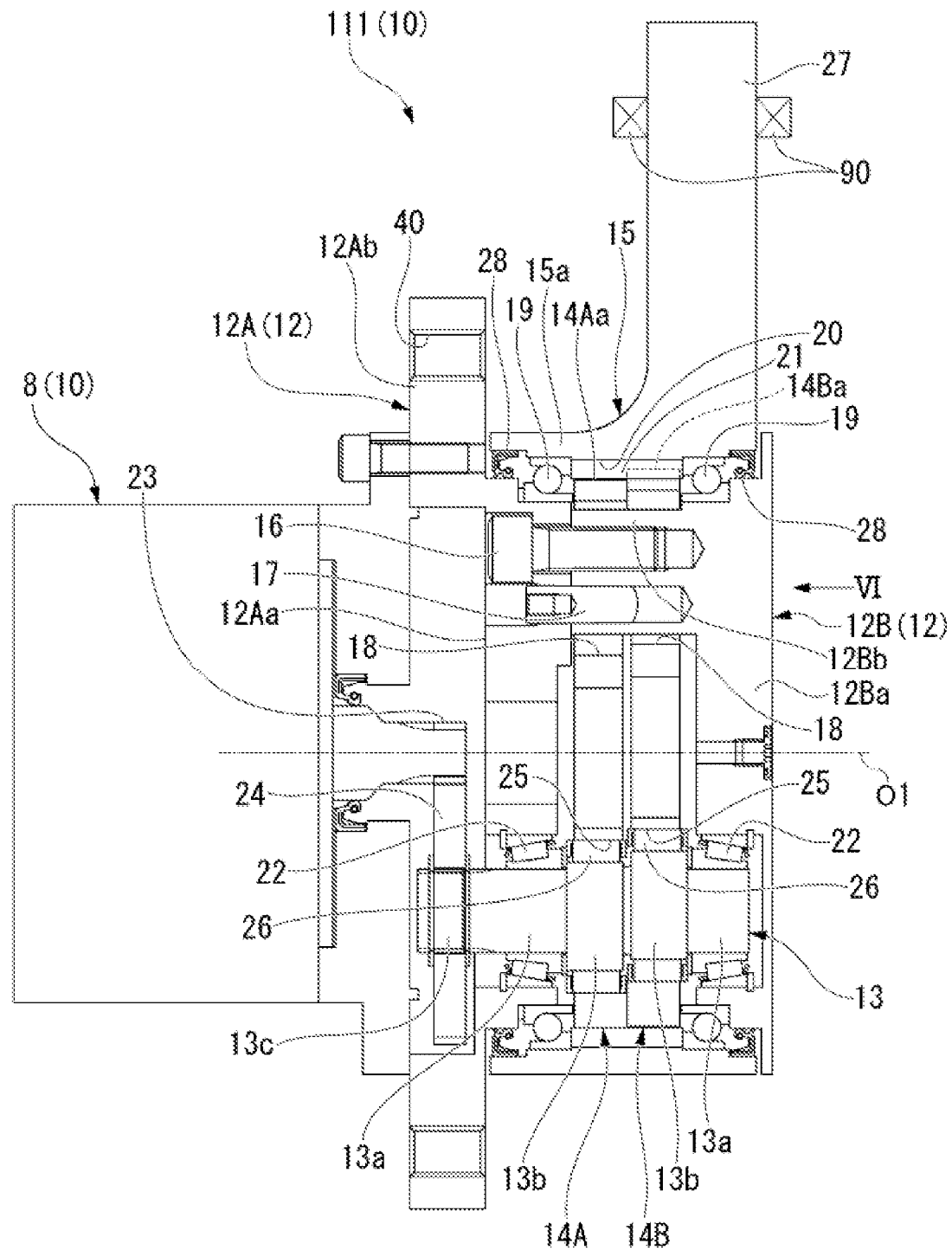
FIG. 5 is a longitudinal sectional view of a speed reducer according to a second embodiment.
Figure 6:
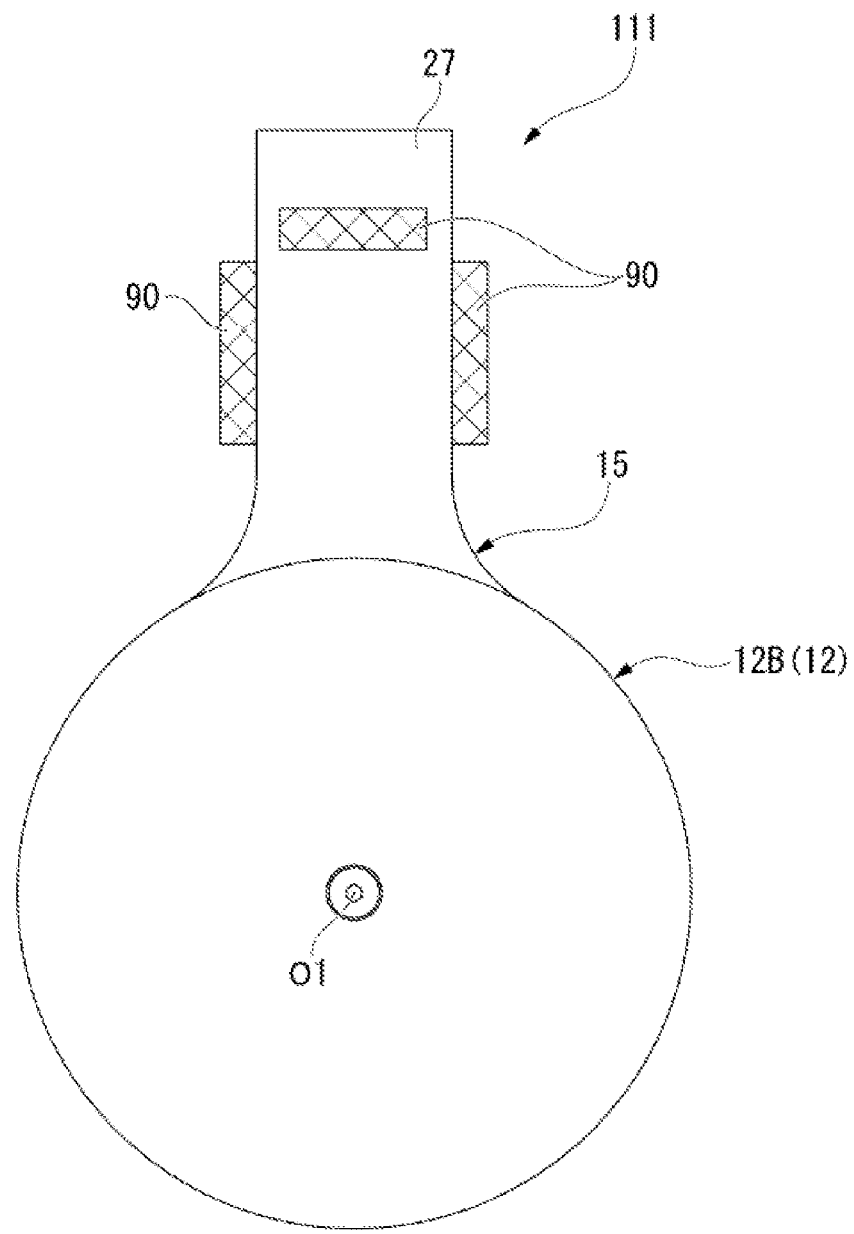
FIG. 6 shows the speed reducer according to the second embodiment viewed along the arrow VI in FIG. 5.
Figure 7:
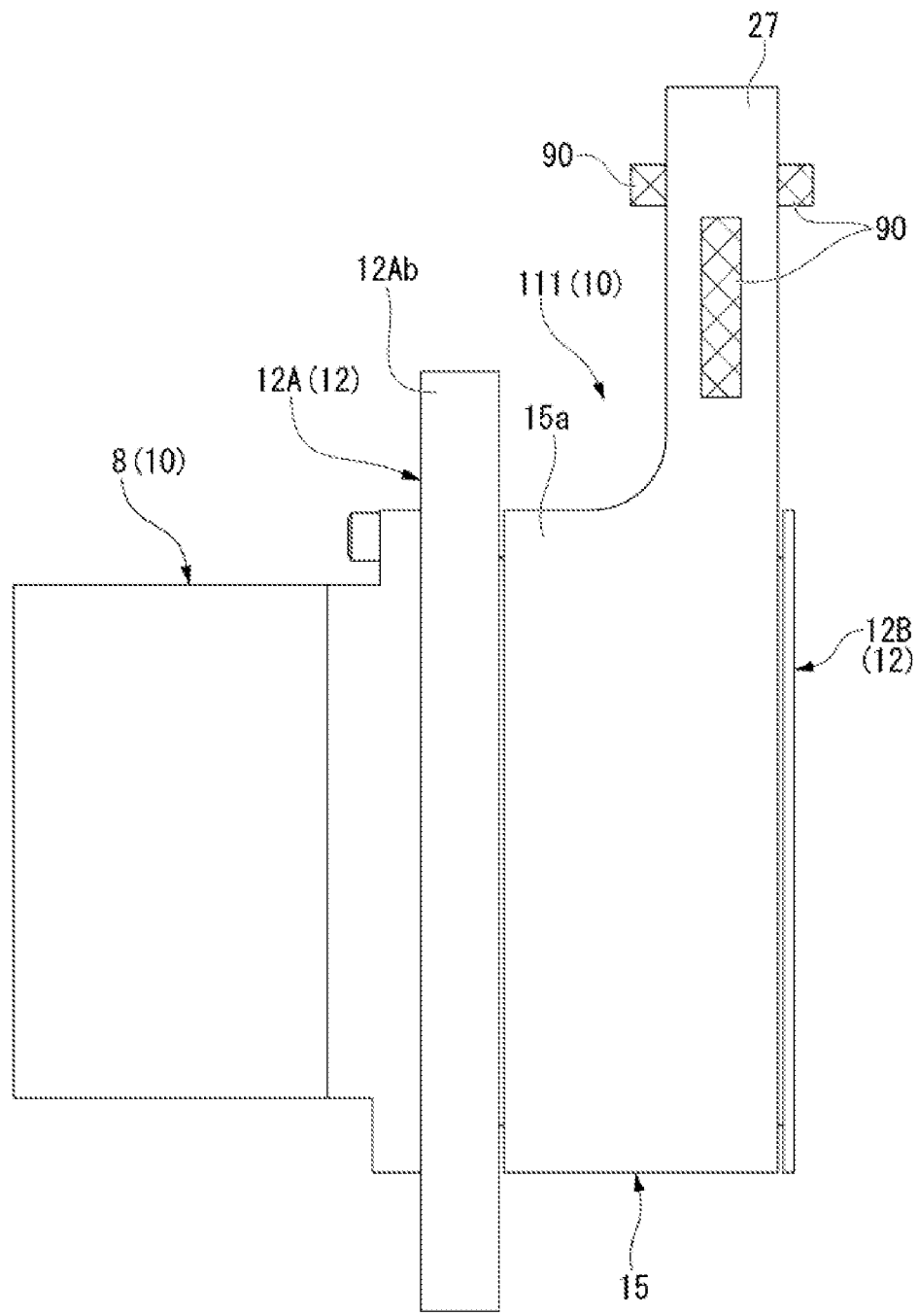
FIG. 7 is a side view of the speed reducer according to the second embodiment.

FIG. 5 is a longitudinal sectional view of a speed reducer 111 according to a second embodiment. FIG. 6 shows the speed reducer 111 viewed along the arrow VI in FIG. 5, and FIG. 7 is a side view of the speed reducer 111. The speed reducer 111 relating to the second embodiment includes a base block 12 fixedly provided in a vehicle, a plurality of crankshafts 13 (input rotating body) rotatably supported on the base block 12, a first oscillating gear 14A and a second oscillating gear 14B configured to rotate oscillatorily when acted upon by the rotation of the crankshafts 13, and a tubular case 15 covering the radially outer surface of the first and second oscillating gears 14A and 14B. In the inner peripheral surface of the tubular case 15, pin grooves 20 are formed. The pin grooves 20 retain the inner tooth pins 21 therein. The inner tooth pins 21 constitute the speed reducing mechanism unit when combined with the first and second oscillating gears 14A and 14B. The foregoing basic configuration of the second embodiment is the same as that of the first embodiment. The fixture flange 12Ab extending radially outward from the substrate portion 12Aa of the first base block 12A has a bolt insertion hole 40 axially extending though the fixture flange 12Ab. The bolt insertion hole 40 receives a bolt for fixture onto a vehicle body.

The tubular case 15 includes a case body portion 15a and an output arm 27. The case body portion 15a covers the radially outer surface of the speed reducing mechanism unit. The output arm 27 extends radially outward from the outer peripheral surface of the case body portion 15a on one side in the axial direction (opposite to the motor 8). The output arm 27 is formed integrally with the case body portion 15a by casting or the like. The output arm 27 is shaped like a prism, for example.

The four side surfaces of the output arm 27 have strain gauges 90 attached thereto for sensing a strain acting on the output arm 27. The strain gauges 90 are electrically connected to an input portion of a controller (not shown) and output a sensing signal in accordance with the strain to the controller.

A rotation detector device (not shown) for sensing the rotation speed of the output arm 27 is attached to an appropriate portion of the speed reducer 111, for example, in the gap between the base block 12 and the tubular case 15. The rotation detector device is electrically connected to an input portion of the controller (not shown) and outputs to the controller a sensing signal indicating the rotation speed of the output arm 27.

The controller receives sensing signals from the strain gauges 90 and the rotation detector device. Based on the sensing signals, the controller calculates an average torque acting on the output arm 27 and an average number of rotations, and determines from the calculation results whether or not the speed reducer 111 is approaching the limit of its service life. When the controller determines that the speed reducer 111 is approaching the limit of its service life, the controller puts on an alarm sign or the like to inform the user that the timing for replacement of the speed reducer 111 has been reached.

As described above, in the speed reducer 111 of the embodiment, the output arm 27 extending radially outward from the outer peripheral surface of the tubular case 15 is integrated with the tubular case 15. Therefore, it is possible to output a stable torque through the output arm 27 to the outside without enlargement of the size or weight of the speed reducer 111 as a whole or increase of the amount of production work, unlike the case where a fixing flange is provided on the tubular case 15 and an output arm formed separately is bolted to this flange (the conventional structure).

Also, in the speed reducer 111 of the embodiment, the output arm 27, which extends radially outward from the outer peripheral surface of the tubular case 15, has the strain gauges 90 attached thereto for sensing the strain acting on the output arm 27. Therefore, it is possible to accurately determine whether or not the speed reducer 111 is approaching the limit of its service life using the sensing values obtained by the strain gauges 90. In particular, when the speed reducer 111 is equipped with the rotation detector device in addition to the strain gauges 90, it is possible to more accurately determine whether or not the speed reducer 111 is approaching the limit of its service life.

The following lists other modifications that can be derived from the above-described second embodiment. Stated differently, the second embodiment includes the following modifications.

(2-1) A speed reducer including:
an input rotating body (for example, the crankshaft 13) rotatable when acted upon by power fed from a drive device;
a speed reducing mechanism unit (for example, the first and second oscillating gears 14A and 14B and the inner tooth pins 21) for reducing a speed of rotation of the input rotating body; and
a tubular case (for example, the tubular case 15) covering an outer surface of the speed reducing mechanism unit and configured to rotate when acted upon by speed-reduced power from the speed reducing mechanism unit,
wherein an output arm (for example, the output arm 27) is formed integrally with the tubular case, the output arm extending radially outward from an outer peripheral surface of the tubular case and configured to transmit a manipulating force to an outside, and
wherein the output arm has a strain gauge (for example, the strain gauge 90) attached thereto, for sensing a strain acting on the output arm.

(2-2) A speed reducer including:
a base block (for example, the base block 12);
a crankshaft (for example, the crankshaft 13) including an eccentric rotating portion and rotatably supported on the base block, the crankshaft being configured to receive power input from a drive device;
an oscillating gear (for example, the first and second oscillating gears 14A, 14B) having outer teeth on an outer periphery thereof and configured to rotate oscillatorily when acted upon by an eccentric rotational force from the eccentric rotating portion; and
a tubular case (for example, the tubular case 15) having inner teeth the number of which is different from the number of the outer teeth, the tubular case being rotatably supported on the base block and configured to rotate in mesh with the outer teeth,
wherein an output arm (for example, the output arm 27) is formed integrally with the tubular case, the output arm extending radially outward from an outer peripheral surface of the tubular case and configured to transmit a manipulating force to an outside, and
wherein the output arm has a strain gauge (for example, the strain gauge 90) attached thereto, for sensing a strain acting on the output arm.

(2-3) A drive unit including:
a drive device for outputting rotational power; and
a speed reducer for reducing a speed of input rotation when acted upon by power fed from the drive device,
wherein the speed reducer includes:
an input rotating body rotatable when acted upon by power fed from the drive device;
a speed reducing mechanism unit for reducing a speed of rotation of the input rotating body; and
a tubular case covering an outer surface of the speed reducing mechanism unit and configured to rotate when acted upon by speed-reduced power from the speed reducing mechanism unit,
wherein an output arm is formed integrally with the tubular case, the output arm extending radially outward from an outer peripheral surface of the tubular case and configured to transmit a manipulating force to an outside, and
wherein the output arm has a strain gauge attached thereto, for sensing a strain acting on the output arm.

(2-4) A steering assisting device including:
a drive device for outputting rotational power;
a speed reducer for reducing a speed of input rotation when acted upon by power fed from the drive device; and
a steering mechanism operable when acted upon by speed-reduced power from the speed reducer,
wherein the speed reducer includes:
an input rotating body rotatable when acted upon by power fed from the drive device;
a speed reducing mechanism unit for reducing a speed of rotation of the input rotating body; and
a tubular case covering an outer surface of the speed reducing mechanism unit and configured to rotate when acted upon by speed-reduced power from the speed reducing mechanism unit,
wherein an output arm is formed integrally with the tubular case, the output arm extending radially outward from an outer peripheral surface of the tubular case and configured to transmit a manipulating force to an outside, and
wherein the output arm has a strain gauge attached thereto, for sensing a strain acting on the output arm.

Third Embodiment

Figure 8:
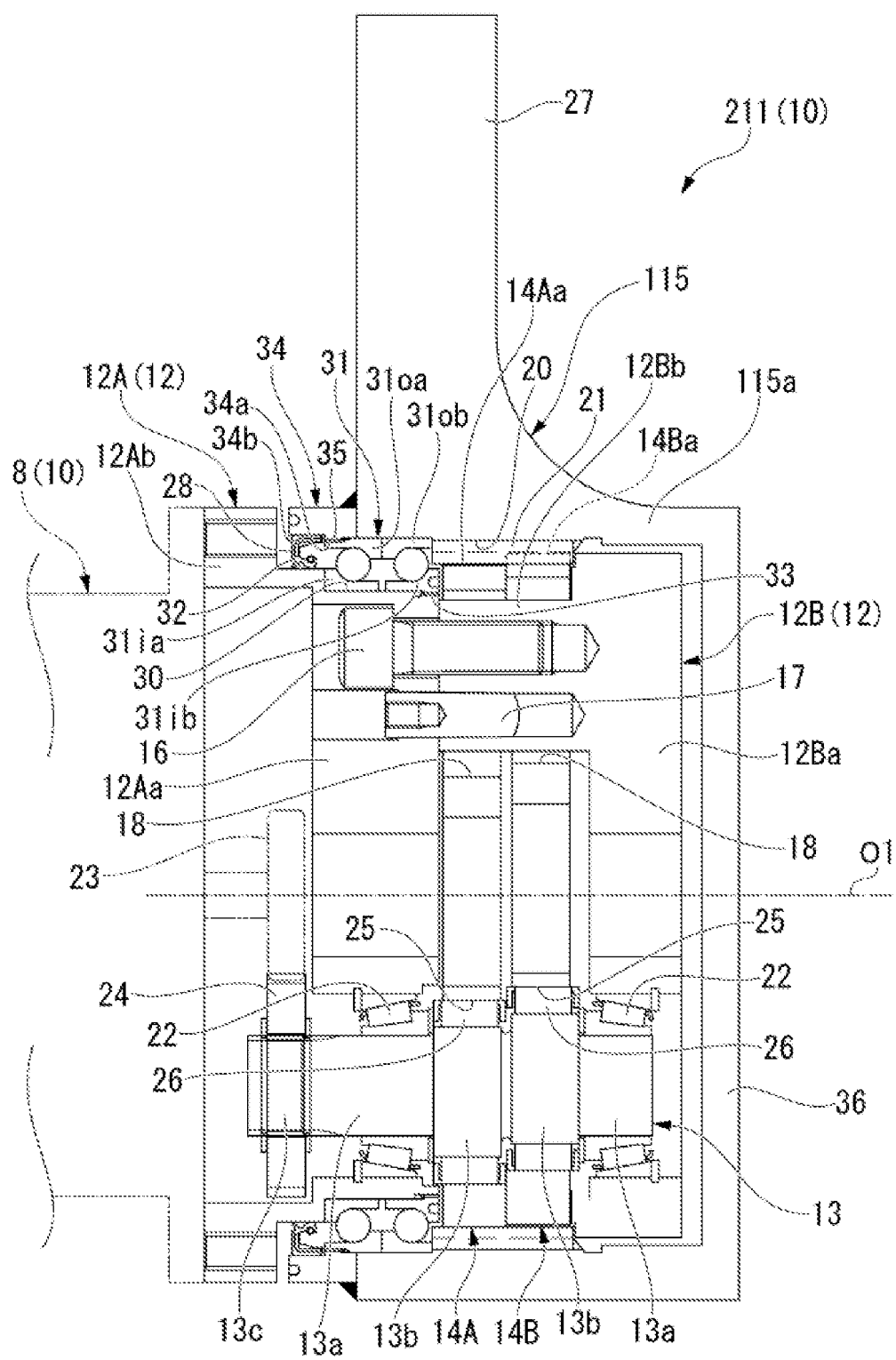
FIG. 8 is a longitudinal sectional view of a speed reducer according to a third embodiment.

FIG. 8 is a longitudinal sectional view of a speed reducer 211 according to a third embodiment. The speed reducer 211 includes a base block 12 fixedly provided in a vehicle, a plurality of crankshafts 13 (input rotating body) rotatably supported on the base block 12, a first oscillating gear 14A and a second oscillating gear 14B configured to rotate oscillatorily when acted upon by the rotation of the crankshafts 13, and a tubular case 115 covering the radially outer surface of the first and second oscillating gears 14A and 14B. In the inner peripheral surface of the tubular case 115, pin grooves 20 are formed. The pin grooves 20 retain the inner tooth pins 21 therein. The inner tooth pins 21 constitute the speed reducing mechanism unit when combined with the first and second oscillating gears 14A and 14B. The specific configuration of the crankshafts 13 and the speed reducing mechanism unit are the same as in the first embodiment.

The base block 12 includes a first base block 12A positioned on one side in the axial direction and a second base block 12B positioned on the other side in the axial direction. The second base block 12B is assembled with the first base block 12A by fixedly fastening the coupling columns 12Bb to the substrate portion 12Aa via bolts 16, with the coupling columns 12Bb being pressed against the substrate portion 12Aa of the first base block 12A.

In the outer peripheral surface of the substrate portion 12Aa of the first base block 12A, a bearing supporting surface 30 is formed to have a predetermined outer diameter. The bearing supporting surface 30 supports a bearing 31, and the tubular case 115 is rotatably supported on the base block 12 via the bearing 31. An example of the bearing 31 is a combined angular bearing. The bearing 31 is hereafter referred to as "the combined angular bearing 31." The combined angular bearing 31 in the embodiment includes two angular ball bearings having a contact angle arranged in the axial direction. The combined angular bearing 31 is disposed between the base block 12 and the tubular case 115 and configured to support radial loads and thrust loads. The portion of the outer peripheral surface of the substrate portion 12Aa positioned on the axially outer side of the bearing supporting surface 30 forms a seal supporting surface 32 having a larger outer diameter than the bearing supporting surface 30. An annular seal member 28 is interposed between the seal supporting surface 32 and the inner peripheral surface of the tubular case 115 so as to tightly close the gap between them.

In assembling the speed reducer 211, the bearing supporting surface 30 and the seal supporting surface 32 of the substrate portion 12Aa in the first base block 12A are inserted into an inner peripheral portion of the tubular case 115. In the embodiment, the substrate portion 12Aa forms an insertion portion of the base block 12. The insertion portion of the base block 12 is inserted into the inside of the tubular case 115 from one side of the tubular case 115 in the axial direction, along with the input rotating body (the crankshaft 13) and the speed reducing mechanism unit (the first oscillating gear 14A, the second oscillating gear 14B and the like). The combined angular bearing 31 and the seal member 28 are interposed between the insertion portion of the base block 12 and the tubular case 115. The seal member 28 is disposed on one side of the tubular case 115 in the axial direction relative to the combined angular bearing 31 and configured to tightly close the gap between the tubular case 115 and the base block 12.

A screwing portion 33 capable of fixing with ridges and grooves is provided in the outer peripheral surface of the end portion of the bearing supporting surface 30 of the substrate portion 12Aa on the axially opposite side to the seal supporting surface 32 and in the inner peripheral surface of an inner race 31ib of the combined angular bearing 31 positioned on the axially inner side. Of the two inner races 31ia, 31ib of the combined angular bearing 31, the inner race 31ia positioned on the axially outer side is in contact with a step surface between the bearing supporting surface 30 and the seal supporting surface 32. Of the two inner races 31ia, 31ib of the combined angular bearing 31, the inner race 31ib positioned on the axially inner side is fixed to the end portion of the bearing supporting surface 30 by the screwing portion 33. This arrangement causes the two inner races 31ia, 31ib to be temporarily locked on the base block 12 side (the first base block 12A side).

The tubular case 115 includes a case body portion 115a, an output arm 27, an end wall 36, and an auxiliary tube 34. The case body portion 115a covers the radially outer surface of the speed reducing mechanism unit. The output arm 27 extends radially outward from the outer peripheral surface of the case body portion 115a on one side in the axial direction (opposite to the motor 8). The end wall 36 closes the other end portion of the case body portion 115a positioned on the other side in the axial direction. The auxiliary tube 34 is fixed by welding to one end surface of the case body portion 115a positioned on one side in the axial direction. The output arm 27 and the end wall 36 are formed integrally with the case body portion 115a by casting or the like.

The inner diameter of the auxiliary tube 34 is substantially the same as the inner diameter of the case body portion 115a. A screwing portion 35 capable of fixing with ridges and grooves is provided in the region 34a of the inner peripheral surface of the auxiliary tube 34 close to the case body portion 115a and in the outer peripheral surface of the outer race 31oa of the combined angular bearing 31 positioned on the axially outer side. Of the two outer races 31oa, 31ob of the combined angular bearing 31, the outer race 31ob positioned on the axially inner side is in contact with a step surface of a portion of the case body portion 115a forming the pin grooves 20. Of the two outer races 31oa, 31ob of the combined angular bearing 31, the outer race 31oa positioned on the axially outer side is fixed to the inner surface of the auxiliary tube 34 by the screwing portion 35. This arrangement causes the two outer races 31oa, 31ob to be temporarily locked on the tubular case 115 side. The region 34b of the inner peripheral surface of the auxiliary tube 34 on the side distant to the case body portion 115a is in contact with the outer peripheral surface of the seal member 28. In the embodiment, the region 34a of the inner peripheral surface of the auxiliary tube 34 close to the case body portion 115a (the screwing portion 35) constitutes an outer race locking portion, and the region 34b of the inner peripheral surface of the auxiliary tube 34 distant to the case body portion 115a constitutes a seal contact portion. The space delineated by the tubular case 115 and the base block 12, where the speed reducing mechanism unit is placed, is filled with a lubricant liquid for lubricating mechanical parts such as the speed reducing mechanism unit.

The speed reducer 211 is assembled as follows. First, the first oscillating gear 14A, the second oscillating gear 14B, and the crankshaft 13 are temporarily assembled to the first base block 12A and the second base block 12B. Next, the first base block 12A and the second base block 12B in the temporary assembly are integrally coupled with each other by the bolts 16. In this state, the inner races 31ia, 31ib of the combined angular bearing 31 are temporarily assembled to the outer peripheral surface of the substrate portion 12Aa of the first base block 12A in the above-described manner. Also, the outer race 31oa, 31ob side of the combined angular bearing 31 is temporarily assembled to the inner peripheral surface of the tubular case 115 in the above-described manner, and the seal member 28 is attached to the inner peripheral surface of the auxiliary tube 34.

Next, in this state, a part of the base block 12 (the second base block 12B and the insertion portion of the first base block 12A) is inserted into the inside of the tubular case 115 from one side of the tubular case 115 in the axial direction, along with the first oscillating gear 14A, the second oscillating gear 14B, and the crankshaft 13. At this time, the combined angular bearing 31 is assembled, and the inner peripheral surface of the seal member 28 is contacted with the seal supporting surface 32 of the first base block 12A. The base block 12 is then restrained from coming off the tubular case 15 by a retaining means (not shown). The space delineated by the tubular case 115 and the base block 12 is then filled with a lubricant liquid. The gap between one side of the tubular case 115 in the axial direction and the base block 12 is closed tightly by the seal member 28, and the other end side of the tubular case 115 in the axial direction is sealed by the end wall 36.

As described above, in the speed reducer 211 of the embodiment, the output arm 27 extending radially outward from the outer peripheral surface of the tubular case 115 is integrated with the tubular case 115. Therefore, it is possible to output a stable torque through the output arm 27 to the outside without enlargement of the size or weight of the speed reducer 211 as a whole or increase of the amount of production work, unlike the case where a fixing flange is provided on the tubular case 115 and an output arm formed separately is bolted to this flange (the conventional structure).

Also, in the speed reducer 211 of the embodiment, the other end portion of the tubular case 115 in the axial direction is completely closed by the end wall 36 integrated with the tubular case 115. Therefore, the lubricant liquid can be prevented from leaking out from the other end side of the tubular case 115 in the axial direction, without providing a seal member between the inner peripheral surface of the tubular case 115 on the other end side in the axial direction and the base block 12.

In the speed reducer 211 of the embodiment, the combined angular bearing 31 is disposed in the gap between the insertion portion of the base block 12 and the tubular case 115, and the seal member 28 is disposed on one end side of the tubular case 115 in the axial direction relative to the combined angular bearing 31. Therefore, in assembling the speed reducer 211, a part of the base block 12 can be readily placed into the inside of the tubular case 115 from one side of the tubular case 115 along with the speed reducing mechanism unit and the crankshaft 13 (the input rotating body), and the number of parts of the seal member 28 can be reduced.

Further, in the speed reducer 211 of the embodiment, the auxiliary tube 34 formed separately from the case body portion 115a of the tubular case 115 has the outer race locking portion and the seal contact surface formed thereon. Therefore, it is possible that the auxiliary tube 34 having a small size is worked accurately and then the auxiliary tube 34 is mounted to the case body portion 115a. Accordingly, the speed reducer 211 of the embodiment allows accurate and simple manufacturing of the tubular case 115.

Figure 9:
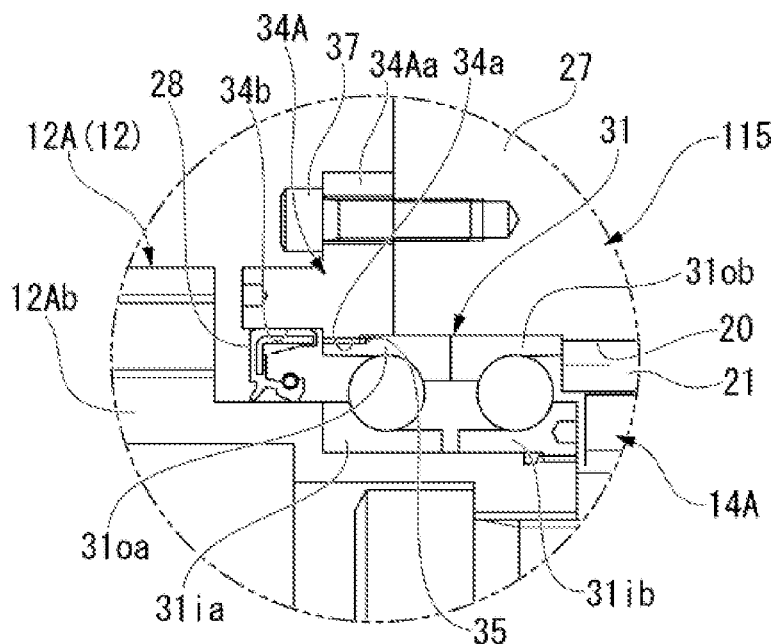
FIG. 9 is a sectional view of a first modification of the speed reducer according to the third embodiment.

FIG. 9 is a sectional view showing a first modification of the speed reducer 211 of the embodiment. In the speed reducer 211 shown in FIG. 8, the auxiliary tube 34 is fixed by welding to one end surface of the case body portion 115a of the tubular case 115 positioned on one side in the axial direction. By contrast, in the first modification, a fixture flange 34Aa extending radially outward is formed integrally with the auxiliary tube 34A, and the fixture flange 34Aa is coupled by a bolt 37 to one end surface of the case body portion 115a positioned on one side in the axial direction. The auxiliary tube 34A and the outer race 31oa of the combined angular bearing 31 are fixed to each other by the screwing portion 35.

Figure 10:
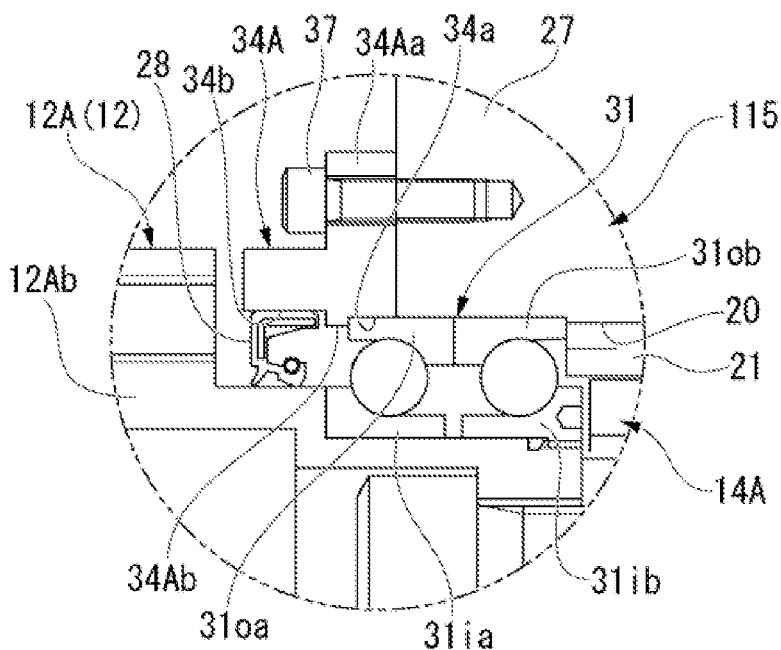
FIG. 10 is a sectional view of a second modification of the speed reducer according to the third embodiment.

FIG. 10 is a sectional view showing a second modification of the speed reducer 211 of the embodiment. In the auxiliary tube 34A of the second embodiment, the fixture flange 34Aa is fixed to the case body portion 115a by the bolt 37, as in the first modification. However, the outer race locking portion of the auxiliary tube 34A is formed of a locking projection 34Ab, instead of the screwing portion 35. The locking projection 34Ab projects radially inward from the inner peripheral surface of the auxiliary tube 34A and contacts with an end surface of the outer race 31oa of the angular bearing 31 on the outer side in the axial direction. This arrangement restrains the outer race 31oa of the angular bearing 31 from coming off.

Figure 11:
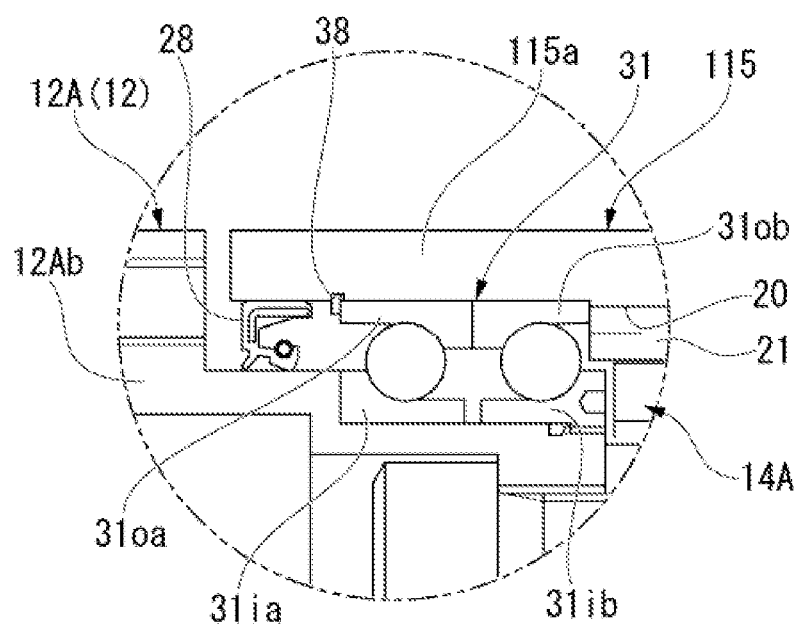
FIG. 11 is a sectional view of a third modification of the speed reducer according to the third embodiment.

FIG. 11 is a sectional view showing a third modification of the speed reducer 211 of the embodiment. In the third modification, the auxiliary tube 34 formed separately is not provided, but the portion of the case body portion 115a of the tubular case 115 on one side in the axial direction extends toward the fixture flange 12Ab of the first base block 12A. The outer races 31oa, 31ob of the angular bearing 31 are disposed on the inner peripheral surface of the portion of the case body portion 115a extending toward one side in the axial direction. The outer race 31oa positioned on the axially outer side is restrained from coming off by a retaining ring 38 fixed to the inner peripheral surface of the case body portion 115a.

The following lists other modifications that can be derived from the above-described third embodiment. Stated differently, the third embodiment includes the following modifications.

(3-1) A speed reducer including:
a base block (for example, the base block 12);
an input rotating body (for example, the crankshaft 13) rotatably supported on the base block and configured to rotate when acted upon by power from a drive device (for example, the motor 8);
a speed reducing mechanism unit (for example, the first and second oscillating gears 14A and 14B and the inner tooth pins 21) for reducing a speed of rotation of the input rotating body; and
a tubular case (for example, the tubular case 115) covering an outer surface of the speed reducing mechanism unit and configured to rotate when acted upon by speed-reduced power from the speed reducing mechanism unit,
wherein the base block includes an insertion portion (for example, the substrate portion 12Aa), the insertion portion being inserted into the tubular case from one side of the tubular case in the axial direction, along with the input rotating body and the speed reducing mechanism unit,
wherein a gap between the insertion portion and the tubular case contains:
a combined angular bearing (for example, the combined angular bearing 31); and
a seal member (for example, the seal member 28) positioned on one side of the tubular case in the axial direction relative to the combined angular bearing and configured to tightly close the gap between the tubular case and the insertion portion, and
wherein an end wall (for example, the end wall 36) is formed integrally with the tubular case, the end wall closing the other end portion positioned on the other side in the axial direction.

(3-2) The speed reducer as set forth in (3-1),
wherein the tubular case includes:
a case body portion (for example, the case body portion 115a) containing the speed reducing mechanism unit; and
an auxiliary tube (for example, the auxiliary tube 34) fixed to one end portion of the case body portion in the axial direction, and
wherein on an inner peripheral surface of the auxiliary tube, there are provided an outer race locking portion (for example, the screwing portion 35) and a seal contact portion (for example, the seal supporting surface 32), the outer race locking portion locks an outer race of the combined angular bearing, and the seal contact portion is contacted by the seal member.

(3-3) A speed reducer including:
a base block (for example, the base block 12);
a crankshaft (for example, the crankshaft 13) including an eccentric rotating portion and rotatably supported on the base block, the crankshaft being configured to receive power input from a drive device (for example, the motor 8);
an oscillating gear (for example, the first and second oscillating gears 14A, 14B) having outer teeth on an outer periphery thereof and configured to rotate oscillatorily when acted upon by an eccentric rotational force from the eccentric rotating portion; and
a tubular case (for example, the tubular case 15) having inner teeth (for example, the inner tooth pins 21) the number of which is different from the number of the outer teeth, the tubular case being rotatably supported on the base block and configured to rotate in mesh with the outer teeth, wherein the base block includes an insertion portion (for example, the substrate portion 12Aa), the insertion portion being inserted into the tubular case from one side of the tubular case in the axial direction, along with the crankshaft and the oscillating gear, wherein a gap between the insertion portion and the tubular case contains:
  a combined angular bearing (for example, the combined angular bearing 31); and
  a seal member (for example, the seal member 28) positioned on one side of the tubular case in the axial direction relative to the combined angular bearing and configured to tightly close the gap between the tubular case and the insertion portion, and wherein an end wall (for example, the end wall 36) is formed integrally with the tubular case, the end wall closing the other end portion positioned on the other side in the axial direction.

(3-4) A drive unit including:
a drive device for outputting rotational power; and
a speed reducer for reducing a speed of input rotation when acted upon by power fed from the drive device,
wherein the speed reducer includes:
  a base block;
  an input rotating body rotatably supported on the base block and configured to rotate when acted upon by power from the drive device;
  a speed reducing mechanism unit for reducing a speed of rotation of the input rotating body; and
  a tubular case covering an outer surface of the speed reducing mechanism unit and configured to rotate when acted upon by speed-reduced power from the speed reducing mechanism unit,
wherein the base block includes an insertion portion, the insertion portion being inserted into the tubular case from one side of the tubular case in the axial direction, along with the input rotating body and the speed reducing mechanism unit,
wherein a gap between the insertion portion and the tubular case contains:
  a combined angular bearing; and
  a seal member positioned on one side of the tubular case in the axial direction relative to the combined angular bearing and configured to tightly close the gap between the tubular case and the insertion portion, and
wherein an end wall is formed integrally with the tubular case, the end wall closing the other end portion positioned on the other side in the axial direction.

(3-5) A steering assisting device including:
a drive device for outputting rotational power;
a speed reducer for reducing a speed of input rotation when acted upon by power fed from the drive device; and
a steering mechanism operable when acted upon by speed-reduced power from the speed reducer,
wherein the speed reducer includes:
  a base block;
  an input rotating body rotatably supported on the base block and configured to rotate when acted upon by power from the drive device;
  a speed reducing mechanism unit for reducing a speed of rotation of the input rotating body; and
  a tubular case covering an outer surface of the speed reducing mechanism unit and configured to rotate when acted upon by speed-reduced power from the speed reducing mechanism unit,
wherein the base block includes an insertion portion, the insertion portion being inserted into the tubular case from one side of the tubular case in the axial direction, along with the input rotating body and the speed reducing mechanism unit,
wherein a gap between the insertion portion and the tubular case contains:
  a combined angular bearing; and
  a seal member positioned on one side of the tubular case in the axial direction relative to the combined angular bearing and configured to tightly close the gap between the tubular case and the insertion portion, and
wherein an end wall is formed integrally with the tubular case, the end wall closing the other end portion positioned on the other side in the axial direction.

Fourth Embodiment

Figure 12:
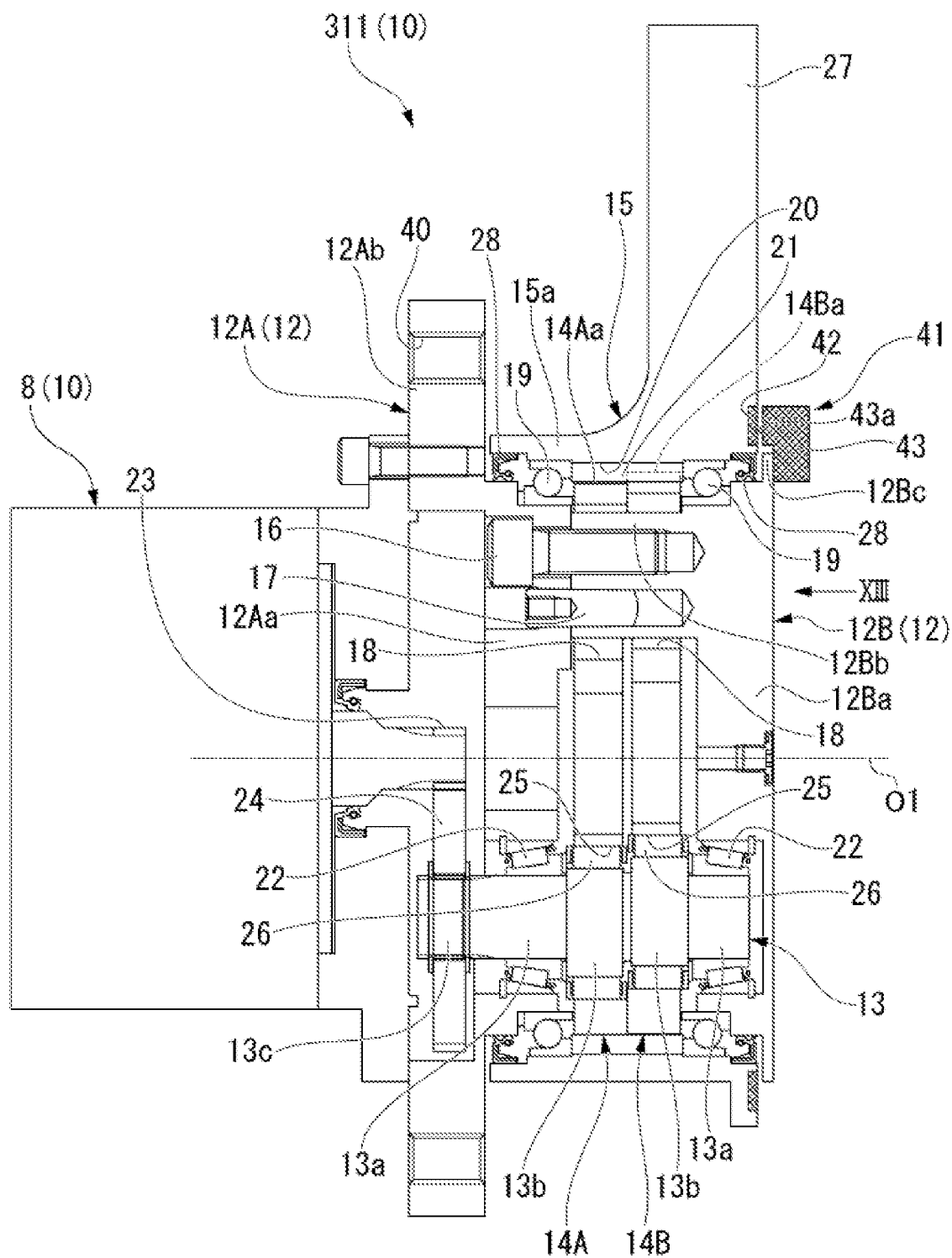
FIG. 12 is a longitudinal sectional view of a drive unit according to a fourth embodiment.
Figure 13:
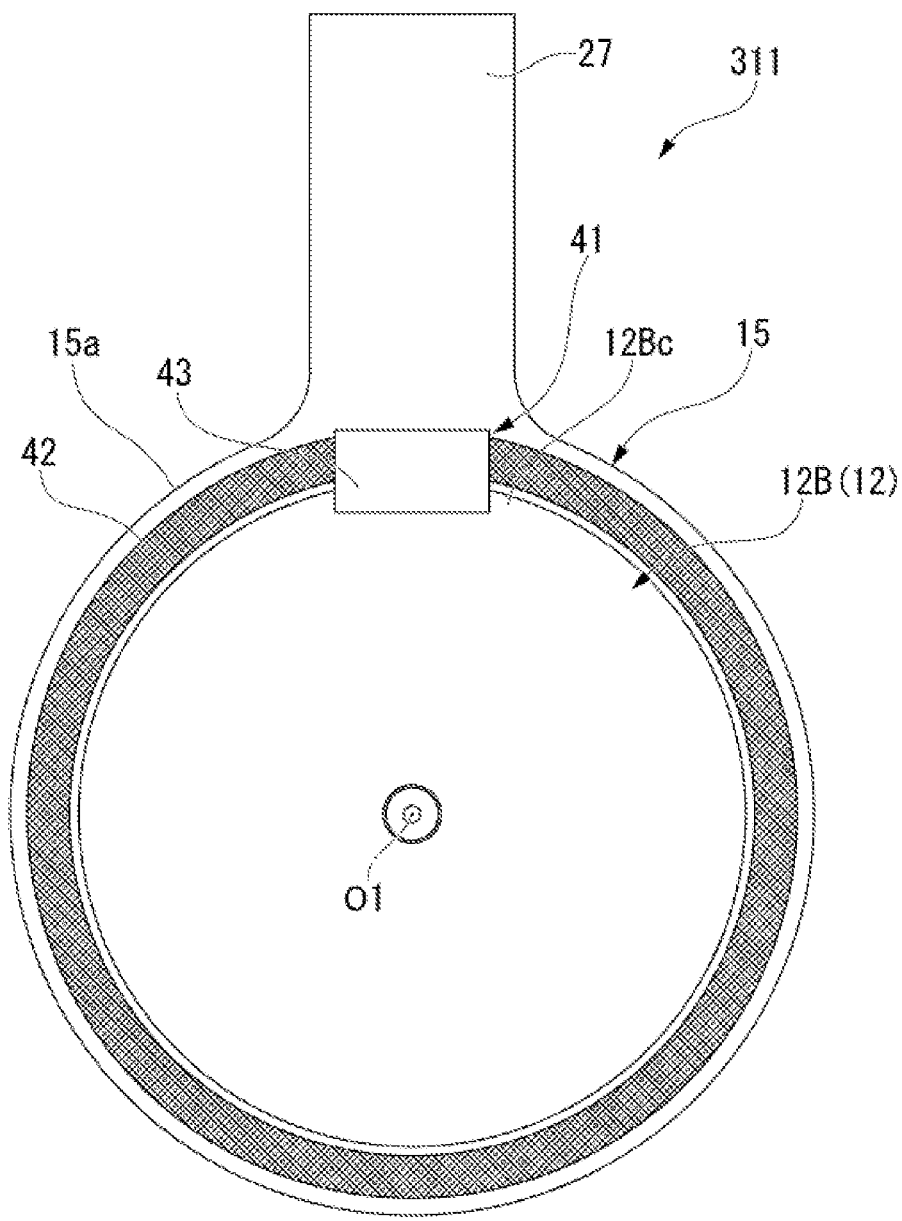
FIG. 13 shows a speed reducer according to the fourth embodiment viewed along the arrow XIII in FIG. 12.

FIG. 12 is a longitudinal sectional view of a drive unit 10 including a speed reducer 311 according to a fourth embodiment. FIG. 13 shows the speed reducer 311 viewed along the arrow XIII in FIG. 12. The speed reducer 311 relating to the fourth embodiment includes a base block 12 fixedly provided in a vehicle, a plurality of crankshafts 13 (input rotating body) rotatably supported on the base block 12, a first oscillating gear 14A and a second oscillating gear 14B configured to rotate oscillatorily when acted upon by the rotation of the crankshafts 13, and a tubular case 15 covering the radially outer surface of the first and second oscillating gears 14A and 14B. In the inner peripheral surface of the tubular case 15, pin grooves 20 are formed. The pin grooves 20 retain the inner tooth pins 21 therein. The inner tooth pins 21 constitute the speed reducing mechanism unit when combined with the first and second oscillating gears 14A and 14B. The foregoing basic configuration of the fourth embodiment is the same as that of the first embodiment.

The base block 12 includes a first base block 12A positioned on one side in the axial direction and a second base block 12B positioned on the other side in the axial direction. The second base block 12B is assembled with the first base block 12A by fixedly fastening the coupling columns 12Bb to the substrate portion 12Aa via bolts 16, with the coupling columns 12Bb being pressed against the substrate portion 12Aa of the first base block 12A. The fixture flange 12Ab extending radially outward from the substrate portion 12Aa of the first base block 12A has a bolt insertion hole 40 axially extending though the fixture flange 12Ab. The bolt insertion hole 40 receives a bolt for fixture onto a vehicle body.

The tubular case 15 includes a case body portion 15a and an output arm 27. The case body portion 15a covers the radially outer surface of the speed reducing mechanism unit. The output arm 27 extends radially outward from the outer peripheral surface of the case body portion 15a on one side in the axial direction (opposite to the motor 8). The case body portion 15a is rotatably supported, via bearings 19, on the outer peripheral surface of the substrate portion 12Aa of the first base block 12A and the outer peripheral surface of the substrate portion 12Ba of the second base block 12B. The output arm 27 is formed integrally with the case body portion 15a by casting or the like. The output arm 27 is shaped like a prism, for example.

A seal member 28 for tightly closing the gap between the substrate portion 12Aa and the case body portion 15a is disposed between the outer peripheral surface of the substrate portion 12Aa of the first base block 12A and the inner peripheral surface of the case body portion 15a on one end side in the axial direction. The seal member 28 is positioned on the axially outer side relative to one of the bearings 19 positioned on one side in the axial direction. Likewise, another seal member 28 for tightly closing the gap between the substrate portion 12Ba and the tubular case 15 is disposed between the outer peripheral surface of the substrate portion 12Ba of the second base block 12B and the inner peripheral surface of the case body portion 15a on the other end side in the axial direction. The other seal member 28 is positioned on the axially outer side relative to the other of the bearings 19 positioned on the other side in the axial direction. The space delineated by the tubular case 15 and the base block 12 is filled with a lubricant liquid for lubricating mechanical parts such as the speed reducing mechanism unit.

An end flange 12Bc is formed integrally with the second base block 12B so as to project radially outward. The end flange 12Bc is disposed to cover the region axially outside the seal member 28 between the substrate portion 12Ba and the tubular case 15. The end flange 12Bc has a rotation detector device 41 attached thereto. The rotation detector device 41 senses the relative rotation position and the relative rotation speed between the base block 12 and the tubular case 15.

The rotation detector device 41 includes a detection target 42 attached to the other end surface of the tubular case 15 in the axial direction and a target detecting unit 43 attached to the end flange 12Bc of the second base block 12B. The target detecting unit 43 outputs to a controller (not shown) a signal in accordance with the change of the detecting status of the detection target 42 with the relative rotation between the base block 12 and the tubular case 15. The rotation detector device 41 can be constituted by, for example, a magnetic or optical detector device. The target detecting unit 43 of the rotation detector device 41 projects radially outward such that the detecting surface 43a of the target detecting unit 43 faces the detection target 42 with a micro gap being provided therebetween. The detecting surface 43a faces the detection target 42 in the axial direction. In the embodiment, the detection target 42 is attached to the end surface of the tubular case 15 on the other side in the axial direction, and the target detecting unit 43 is attached to the end flange 12Bc (the substrate portion 12Ba), but this arrangement is not limitative. For example, it is also possible that, conversely to the embodiment, the target detecting unit 43 is attached to the end surface of the tubular case 15 in the axial direction, and the detection target 42 is attached to the end flange 12Bc.

The signal input from the rotation detector device 41 to the controller can be used, for example, when the controller acknowledges that an assisting signal (drive signal) is suspended from being output to the motor 8 for some reason and takes care of the situation, or when the deviation of the actual rotation from the target output of the motor 8 is corrected. If the controller acknowledges that the assisting signal (drive signal) is suspended from being output to the motor 8, the controller removes the reaction force of the motor 8 acting on the speed reducer 311, for example. This control can prevent the reaction force of the motor 8 from interrupting the driver's manual manipulation of the steering.

As described above, in the speed reducer 311 of the embodiment, the output arm 27 extending radially outward from the outer peripheral surface of the tubular case 15 is integrated with the tubular case 15. Therefore, it is possible to output a stable torque through the output arm 27 to the outside without enlargement of the size or weight of the speed reducer 311 as a whole or increase of the amount of production work, unlike the case where a fixing flange is provided on the tubular case 15 and an output arm formed separately is bolted to this flange (the conventional structure).

Also, the speed reducer 311 of the embodiment is provided with the rotation detector device 41 for sensing the relative rotation between the base block 12 and the tubular case 15. This allows the information relating to the rotation on the output side of the motor 8 to be obtained on the end side of the speed reducer 311 where there is a large space. Accordingly, the information relating to the rotation on the output side of the motor 8 can be effectively used by the controller without increasing the size of the motor 8.

Further, in the speed reducer 311 of the embodiment, the detection target 42 of the rotation detector device 41 is disposed on the end surface of the tubular case 15 in the axial direction, and the target detecting unit 43 is disposed on the end surface of the second base block 12B such that the detecting surface 43a faces the detection target 42. This arrangement facilitates installation of the rotation detector device 41 into the speed reducer 311 from the outside and also facilitates maintenance of the rotation detector device 41.

In the speed reducer 311 of the embodiment, the end flange 12Bc is disposed on the outer periphery of the substrate portion 12Ba of the second base block 12B so as to cover the gap between the substrate portion 12Ba and the tubular case 15. Further, the target detecting unit 43 of the rotation detector device 41 is attached to the end flange 12Bc. Therefore, the end flange 12Bc can prevent foreign substances from entering the gap between the substrate portion 12Ba and the tubular case 15 (the portion in the vicinity of the seal member 28). Further, the detecting surface 43a of the target detecting unit 43 can be positioned closer to the detection target 42 on the tubular case 15 side.

Figure 14:
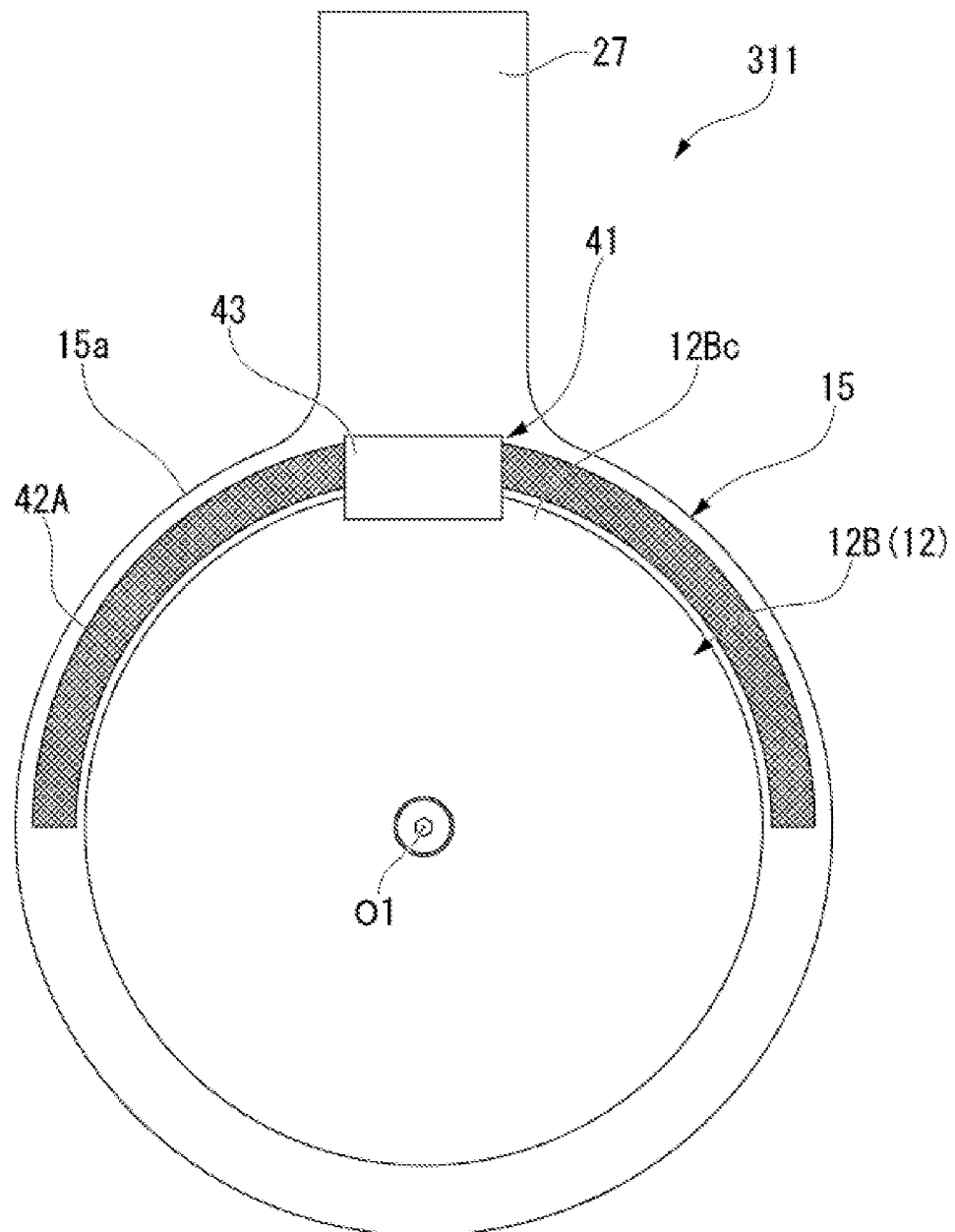
FIG. 14 shows a modification of the speed reducer according to the fourth embodiment, viewed along the arrow XIII in FIG. 12.

FIG. 14 shows a modification of the speed reducer 311 of the embodiment in the same manner as FIG. 13. In the speed reducer 311 shown in FIGS. 12 and 13, the detection target 42 of the rotation detector device 41, which has an annular shape, is disposed on the end surface of the tubular case 15 in the axial direction. By contrast, in the modification shown in FIG. 14, a detection target 42A having a semicircular shape is disposed on the end surface of the tubular case 15 in the axial direction. When the rotation range of the tubular case 15 (the rotation range of the output arm 27) used actually in the speed reducer 311 is narrow, the detection target 42A does not need to have a completely annular shape. Therefore, the detection target 42A may have a semicircular shape as in the modification shown in FIG. 14 or an arc-like shape other than semicircle.

Fifth Embodiment

Figure 15:
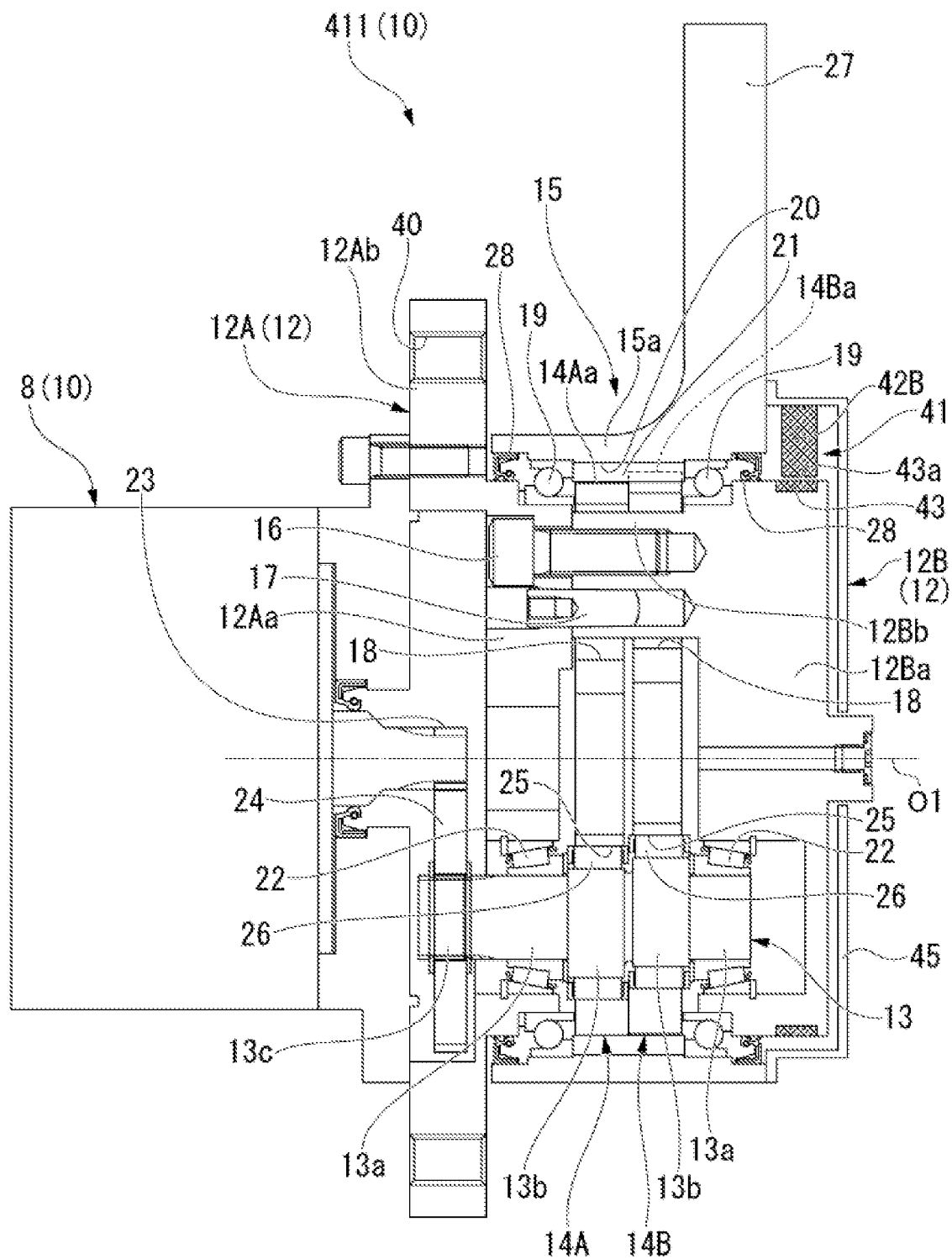
FIG. 15 is a longitudinal sectional view of a drive unit according to a fifth embodiment.

FIG. 15 is a longitudinal sectional view of the drive unit 10 including a speed reducer 411 according to a fifth embodiment. The basic configuration of the speed reducer 411 of the embodiment is substantially the same as that of the speed reducer 311 of the fourth embodiment, except for the portion at which the rotation detector device 41 is disposed. Therefore, in the following description, the same elements as in the speed reducer 311 of the fourth embodiment will be denoted by the same reference signs and redundant descriptions will be partly omitted.

In the speed reducer 411, the end portion of the substrate portion 12Ba of the second base block 12B in the axial direction projects axially outward beyond the other end portion of the tubular case 15 in the axial direction. The target detecting unit 43 of the rotation detector device 41 is attached to the outer peripheral surface of the end portion of the substrate portion 12Ba projecting beyond the tubular case 15.

On the other end surface of the tubular case 15 positioned on the other side in the axial direction, there is mounted a cover member 45 having a bottomed cylindrical shape and covering in a contactless manner the outer peripheral surface and the end surface of the projecting portion of the substrate portion 12Ba. A detection target 42B is attached to the inner peripheral surface of the peripheral wall of the cover member 45. The detection target 42B has a semicircular shape and is disposed along the inner peripheral surface of the peripheral wall of the cover member 45. It is also possible that the detection target 42B has an arc-like shape other than semicircle, or an annular shape. The target detecting unit 43 attached to the outer peripheral surface of the substrate portion 12Ba has the detecting surface 43a facing the detection target 42B with a predetermined amount of gap provided therebetween.

In the embodiment, the target detecting unit 43 is attached to the outer peripheral surface of the substrate portion 12Ba, and the detection target 42B is attached to the inner peripheral surface of the cover member 45, but this arrangement is not limitative. For example, it is also possible that, conversely to the embodiment, the target detecting unit 43 is attached to the inner peripheral surface of the cover member 45, and the detection target 42B is attached to the outer peripheral surface of the substrate portion 12Ba. Further, it is also possible that one of the target detecting unit 43 and the detection target 42B is attached to the end surface of the substrate portion 12Ba, and the other is attached to the inner side end surface of the cover member 45.

In the embodiment, the signal input from the rotation detector device 41 to the controller can be used when the controller acknowledges that an assisting signal (drive signal) is suspended from being output to the motor 8 for some reason and takes care of the situation, or when the deviation of the actual rotation from the target output of the motor 8 is corrected.

As described above, since the speed reducer 411 of the present embodiment is basically configured in the same manner as the speed reducer 311 of the fourth embodiment, the present embodiment can basically produce substantially the same effects as the speed reducer 311 of the fourth embodiment. However, the speed reducer 411 of the present embodiment includes the cover member 45 having a bottomed cylindrical shape and mounted to the tubular case 15. Further, the rotation detector device 41 is disposed between the outer peripheral surface of the substrate portion 12Ba of the base block 12 and the inner peripheral surface of the cover member 45. Therefore, the cover member 45 prevents iron powder or some other foreign substances from entering and reaching the vicinity of the rotation detector device 41, thus inhibiting degradation of the sensing accuracy of the rotation detector device 41. Further, in the present embodiment, the cover member 45 prevents foreign substances from entering and reaching the vicinity of the seal member 28.

The following lists other modifications that can be derived from the above-described fourth and fifth embodiments. Stated differently, the fourth and fifth embodiments include the following modifications:

(4-1) A speed reducer including:
a base block (for example, the base block 12);
an input rotating body (for example, the crankshaft 13) rotatably supported on the base block and configured to rotate when acted upon by power from a drive device (for example, the motor 8);
a speed reducing mechanism unit (for example, the first and second oscillating gears 14A and 14B and the inner tooth pins 21) for reducing a speed of rotation of the input rotating body;
a tubular case (for example, the tubular case 115) covering an outer surface of the speed reducing mechanism unit and configured to rotate when acted upon by speed-reduced power from the speed reducing mechanism unit; and
a rotation detector device (for example, the rotation detector device 41) configured to detect relative rotational state of the base block and the tubular case.

(4-2) The speed reducer as set forth in (4-1),
wherein the rotation detector device includes:
a detection target (for example, the detection target 42, 42A) disposed on any one of an end surface of the tubular case in the axial direction and an end surface of the base block in the axial direction; and
a target detecting unit (for example, the target detecting unit 43) disposed on the other of the end surface of the tubular case in the axial direction and the end surface of the base block in the axial direction, and
wherein a detecting surface (for example, the detecting surface 43a) of the target detecting unit is positioned to face the detection target.

(4-3) The speed reducer as set forth in (4-1),
wherein the tubular case has a cover member (for example, the cover member 45) mounted thereto, the cover member covering an end portion of the tubular case in the axial direction,
wherein the rotation detector device includes:
a detection target (for example, the detection target 42B) disposed on any one of the cover member and an end portion of the base block in the axial direction; and
a target detecting unit (for example, the target detecting unit 43) disposed on the other of the cover member and the end portion of the base block in the axial direction, and
wherein a detecting surface of the target detecting unit is positioned to face the detection target.

(4-4) A speed reducer including:
a base block (for example, the base block 12);
a crankshaft (for example, the crankshaft 13) including an eccentric rotating portion and rotatably supported on the base block, the crankshaft being configured to receive power input from a drive device (for example, the motor 8);
an oscillating gear (for example, the first and second oscillating gears 14A, 14B) having outer teeth on an outer periphery thereof and configured to rotate oscillatorily when acted upon by an eccentric rotational force from the eccentric rotating portion;
a tubular case (for example, the tubular case 15) having inner teeth (for example, the inner tooth pins 21) the number of which is different from the number of the outer teeth, the tubular case being rotatably supported on the base block and configured to rotate in mesh with the outer teeth; and
a rotation detector device (for example, the rotation detector device 41) configured to detect relative rotational state of the base block and the tubular case.

(4-5) A drive unit including:

a drive device for outputting rotational power; and
a speed reducer for reducing a speed of input rotation when acted upon by power fed from the drive device,
wherein the speed reducer includes:
   a base block;
   an input rotating body rotatably supported on the base block and configured to rotate when acted upon by power from the drive device;
   a speed reducing mechanism unit for reducing a speed of rotation of the input rotating body;
   a tubular case covering an outer surface of the speed reducing mechanism unit and configured to rotate when acted upon by speed-reduced power from the speed reducing mechanism unit; and
   a rotation detector device configured to detect relative rotational state of the base block and the tubular case.

(4-6) A steering assisting device including:
a drive device for outputting rotational power;
a speed reducer for reducing a speed of input rotation when acted upon by power fed from the drive device; and
a steering mechanism operable when acted upon by speed-reduced power from the speed reducer,
wherein the speed reducer includes:
   a base block;
   an input rotating body rotatably supported on the base block and configured to rotate when acted upon by power from the drive device;
   a speed reducing mechanism unit for reducing a speed of rotation of the input rotating body;
   a tubular case covering an outer surface of the speed reducing mechanism unit and configured to rotate when acted upon by speed-reduced power from the speed reducing mechanism unit; and
   a rotation detector device configured to detect relative rotational state of the base block and the tubular case.

Sixth Embodiment

Figure 16:
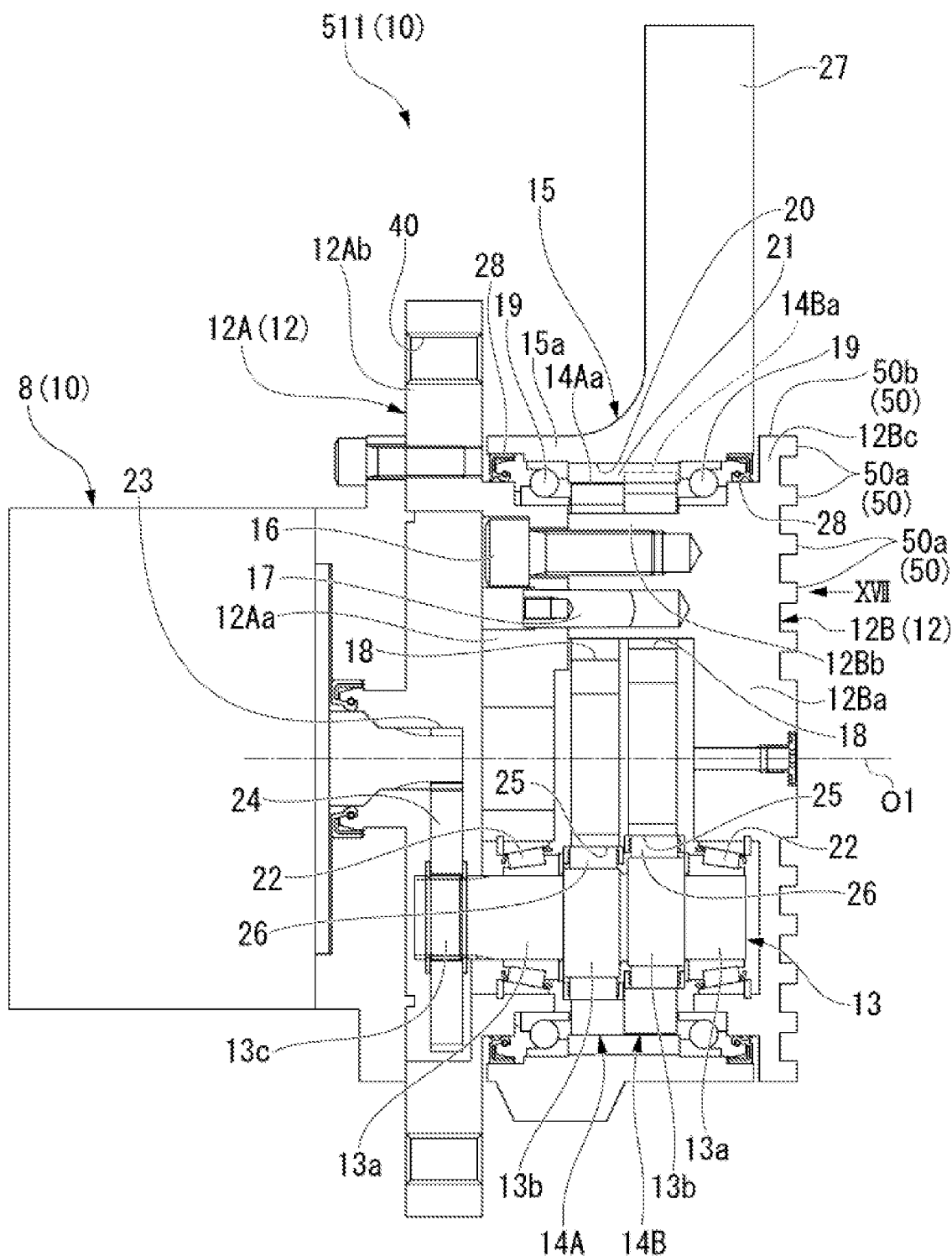
FIG. 16 is a longitudinal sectional view of a drive unit according to a sixth embodiment.
Figure 17:
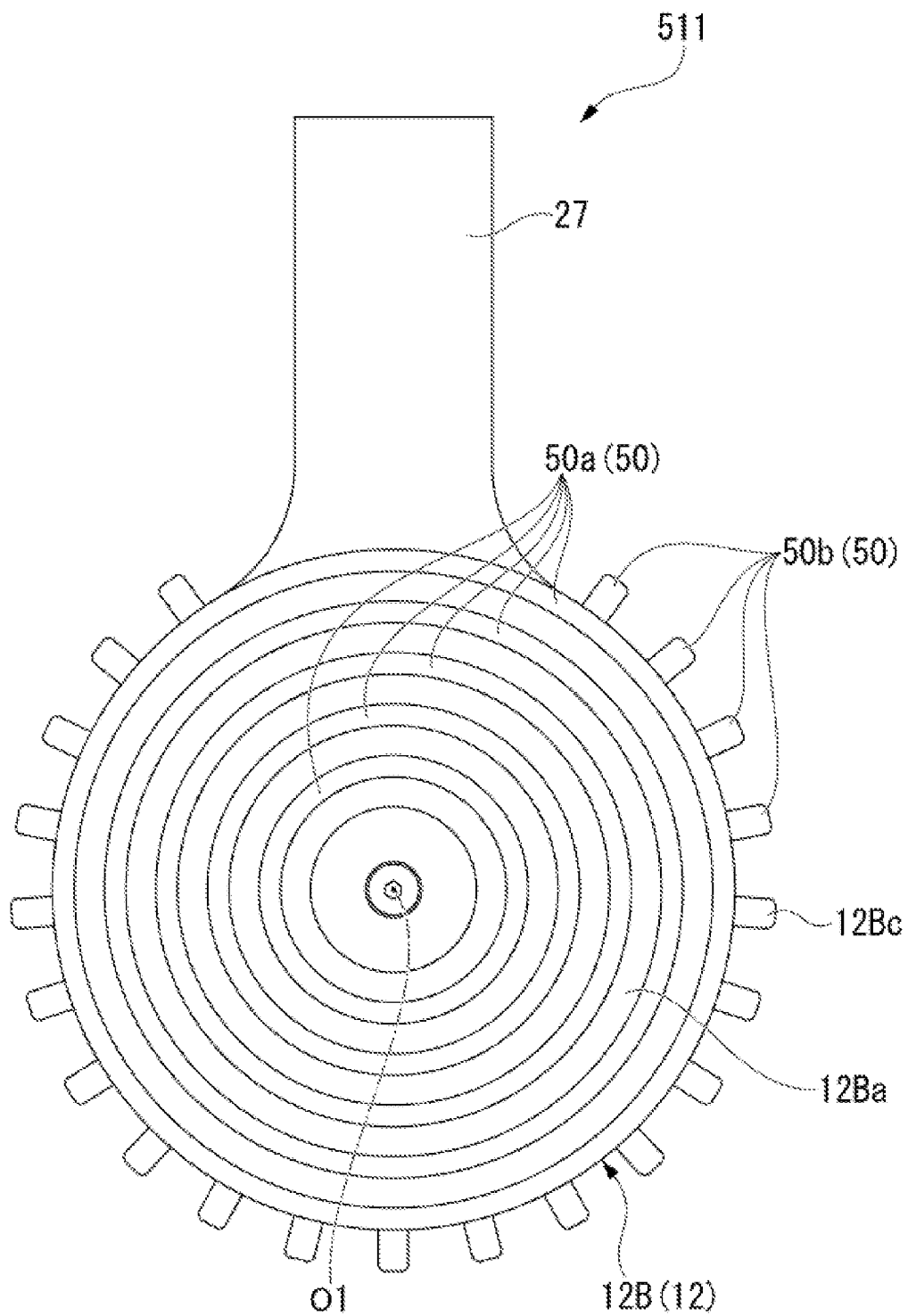
FIG. 17 shows a speed reducer according to the sixth embodiment viewed along the arrow XVII in FIG. 16.

FIG. 16 is a longitudinal sectional view of the drive unit 10 including a speed reducer 511 according to a sixth embodiment, and FIG. 17 shows the speed reducer 511 viewed along the arrow XVII in FIG. 16. The speed reducer 511 relating to the present embodiment includes a base block 12 fixedly provided in a vehicle, a plurality of crankshafts 13 (input rotating body) rotatably supported on the base block 12, a first oscillating gear 14A and a second oscillating gear 14B configured to rotate oscillatorily when acted upon by the rotation of the crankshafts 13, and a tubular case 15 covering the radially outer surface of the first and second oscillating gears 14A and 14B. In the inner peripheral surface of the tubular case 15, pin grooves 20 are formed. The pin grooves 20 retain the inner tooth pins 21 therein. The inner tooth pins 21 constitute the speed reducing mechanism unit when combined with the first and second oscillating gears 14A and 14B. The foregoing basic configuration of the present embodiment is the same as that of the first embodiment.

The base block 12 includes a first base block 12A positioned on one side in the axial direction and a second base block 12B positioned on the other side in the axial direction. The second base block 12B is assembled with the first base block 12A by fixedly fastening the coupling columns 12Bb to the substrate portion 12Aa via bolts 16, with the coupling columns 12Bb being pressed against the substrate portion 12Aa of the first base block 12A. The fixture flange 12Ab extending radially outward from the substrate portion 12Aa of the first base block 12A has a bolt insertion hole 40 axially extending though the fixture flange 12Ab. The bolt insertion hole 40 receives therein a bolt (not shown) for fixture onto a vehicle body.

The tubular case 15 includes a case body portion 15a and an output arm 27. The case body portion 15a covers the radially outer surface of the speed reducing mechanism unit. The output arm 27 extends radially outward from the outer peripheral surface of the case body portion 15a on one side in the axial direction (opposite to the motor 8). The case body portion 15a is rotatably supported, via bearings 19, on the outer peripheral surface of the substrate portion 12Aa of the first base block 12A and the outer peripheral surface of the substrate portion 12Ba of the second base block 12B. The output arm 27 is formed integrally with the case body portion 15a by casting or the like. The output arm 27 is shaped like a prism, for example.

A seal member 28 for tightly closing the gap between the substrate portion 12Aa and the case body portion 15a is disposed between the outer peripheral surface of the substrate portion 12Aa of the first base block 12A and the inner peripheral surface of the case body portion 15a on one side in the axial direction. The seal member 28 is positioned on the axially outer side relative to one of the bearings 19 positioned on one side in the axial direction. Likewise, another seal member 28 for tightly closing the gap between the substrate portion 12Ba and the tubular case 15 is disposed between the outer peripheral surface of the substrate portion 12Ba of the second base block 12B and the inner peripheral surface of the case body portion 15a on the other side in the axial direction. The other seal member 28 is positioned on the axially outer side relative to the other of the bearings 19 positioned on the other side in the axial direction. The space delineated by the tubular case 15 and the base block 12 is filled with a lubricant liquid for lubricating mechanical parts such as the speed reducing mechanism unit.

An end flange 12Bc is formed integrally with the second base block 12B so as to project radially outward. The end flange 12Bc is disposed to cover the region axially outside the seal member 28 between the substrate portion 12Ba and the tubular case 15. A plurality of heat radiation fins 50 are formed integrally with the axially outside end surface of the substrate portion 12Ba including the end flange 12Bc.

The heat radiation fins 50 are divided into two types. One of the types of the heat radiation fins 50 is annular fins 50a projecting axially outward from the end surface of the substrate portion 12Ba, and the other type is radial fins 50b radially projecting from the outer periphery of the end portion of the substrate portion 12Ba. The annular fins 50a have annular shape and extend at some intervals concentrically at the central axis O1 of the substrate portion 12Ba. The multiple (plurality of) annular fins 50a are arranged at different radial positions (with different radii). These heat radiation fins 50 can radiate, to the ambient atmosphere, the heat conducted from the inside of the speed reducer 511 to the substrate portion 12Ba. The radial fins 50b and the outermost annular fin 50a are disposed at substantially the same radial position as the inner tooth pins 21 are retained in the tubular case 15.

As described above, in the speed reducer 511 of the embodiment, the output arm 27 extending radially outward from the outer peripheral surface of the tubular case 15 is integrated with the tubular case 15. Therefore, it is possible to output a stable torque through the output arm 27 to the outside without enlargement of the size or weight of the speed reducer 511 as a whole or increase of the amount of production work, unlike the case where a fixing flange is provided on the tubular case 15 and an output arm formed separately is bolted to this flange (the conventional structure).

Further, the speed reducer 511 of the embodiment, a plurality of heat radiation fins 50 are formed on the portion of the base block 12 exposed outside the tubular case 15 (the end surface of the substrate portion 12Ba). Therefore, the heat generated in the speed reducer 511 by operation of the speed reducing mechanism unit and the like can be radiated efficiently to the ambience. Accordingly, this configuration inhibits increase of the temperature of the base block 12 and the tubular case 15, and this in turn allows increase of the number of rotations of the mechanical parts in the speed reducer 511. It is also possible that the heat radiation fins 50 are formed on the outer peripheral surface of the tubular case 15.

The following lists other modifications that can be derived from the above-described sixth embodiment. Stated differently, the sixth embodiment includes the following modifications.

(5-1) A speed reducer including:
a base block;
an input rotating body rotatably supported on the base block and configured to rotate when acted upon by power from the drive device;
a speed reducing mechanism unit for reducing a speed of rotation of the input rotating body; and
a tubular case covering an outer surface of the speed reducing mechanism unit and configured to rotate when acted upon by speed-reduced power from the speed reducing mechanism unit,
wherein a heat radiation fin is formed on a portion of the base block exposed to an outside of the tubular case.

(5-2) A speed reducer including:
a base block;
a crankshaft including an eccentric rotating portion and rotatably supported on the base block, the crankshaft being configured to receive power input from a drive device;
an oscillating gear having outer teeth on an outer periphery thereof and configured to rotate oscillatorily when acted upon by an eccentric rotational force from the eccentric rotating portion; and
a tubular case having inner teeth the number of which is different from the number of the outer teeth, the tubular case being rotatably supported on the base block and configured to rotate in mesh with the outer teeth,
wherein a heat radiation fin is formed on a portion of the base block exposed to an outside of the tubular case.

(5-3) A drive unit including:
a drive device for outputting rotational power; and
a speed reducer for reducing a speed of input rotation when acted upon by power fed from the drive device,
wherein the speed reducer includes:
a base block;
an input rotating body rotatably supported on the base block and configured to rotate when acted upon by power from the drive device;
a speed reducing mechanism unit for reducing a speed of rotation of the input rotating body; and
a tubular case covering an outer surface of the speed reducing mechanism unit and configured to rotate when acted upon by speed-reduced power from the speed reducing mechanism unit, and
wherein a heat radiation fin is formed on a portion of the base block exposed to an outside of the tubular case.

(5-4) A steering assisting device including:
a drive device for outputting rotational power;
a speed reducer for reducing a speed of input rotation when acted upon by power fed from the drive device; and
a steering mechanism operable when acted upon by speed-reduced power from the speed reducer,
wherein the speed reducer includes:
a base block;
an input rotating body rotatably supported on the base block and configured to rotate when acted upon by power from the drive device;
a speed reducing mechanism unit for reducing a speed of rotation of the input rotating body; and
a tubular case covering an outer surface of the speed reducing mechanism unit and configured to rotate when acted upon by speed-reduced power from the speed reducing mechanism unit, and
wherein a heat radiation fin is formed on a portion of the base block exposed to an outside of the tubular case.

Seventh Embodiment

Figure 18:
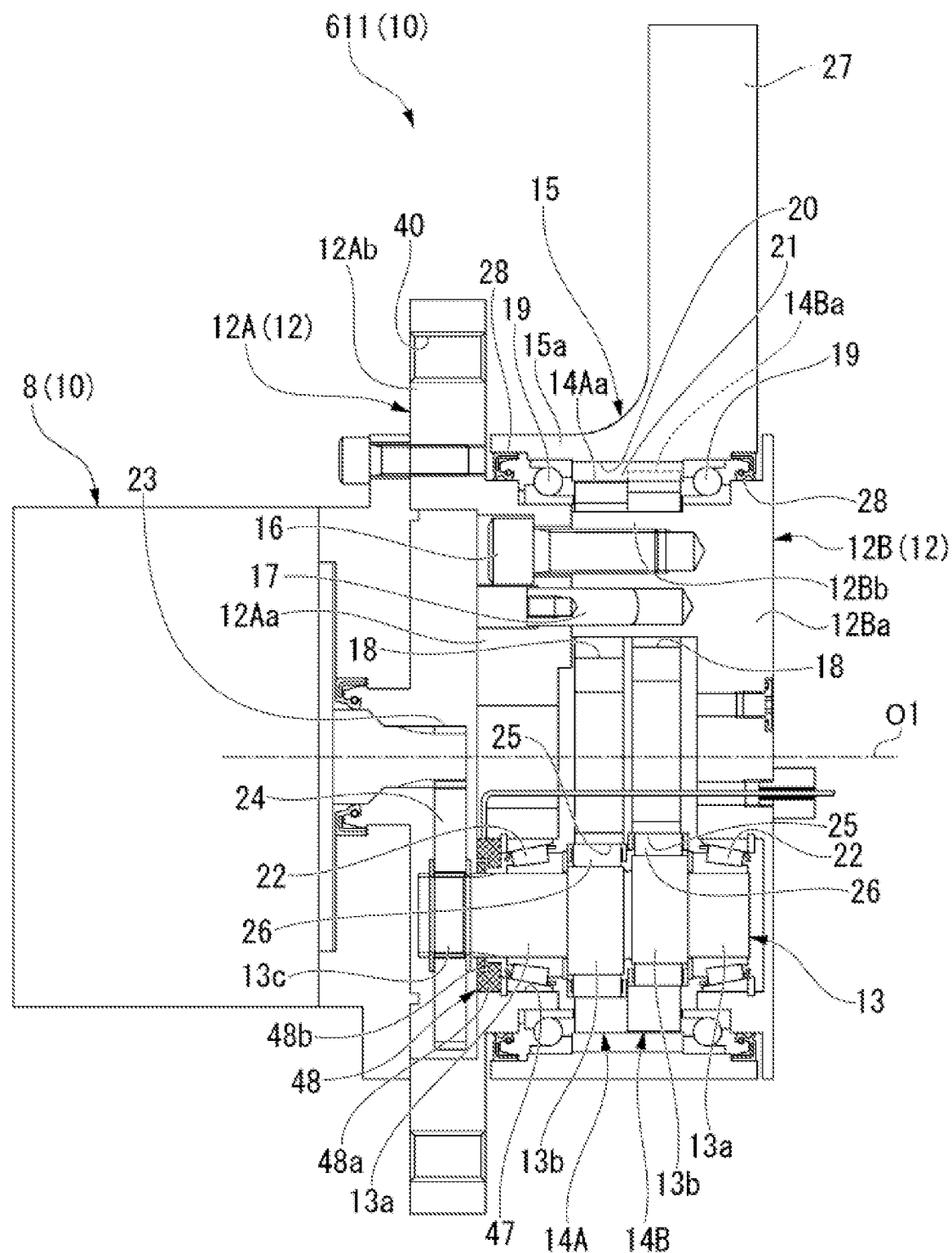
FIG. 18 is a longitudinal sectional view of a drive unit according to a seventh embodiment.

FIG. 18 is a longitudinal sectional view of the drive unit 10 including a speed reducer 611 according to a seventh embodiment. The speed reducer 611 relating to the present embodiment includes a base block 12 fixedly provided in a vehicle, a plurality of crankshafts 13 (input rotating body) rotatably supported on the base block 12, a first oscillating gear 14A and a second oscillating gear 14B configured to rotate oscillatorily when acted upon by the rotation of the crankshafts 13, and a tubular case 15 covering the radially outer surface of the first and second oscillating gears 14A and 14B. In the inner peripheral surface of the tubular case 15, pin grooves 20 are formed. The pin grooves 20 retain the inner tooth pins 21 therein. The inner tooth pins 21 constitute the speed reducing mechanism unit when combined with the first and second oscillating gears 14A and 14B. The foregoing basic configuration of the present embodiment is the same as that of the first embodiment.

The base block 12 includes a first base block 12A positioned on one side in the axial direction and a second base block 12B positioned on the other side in the axial direction. The second base block 12B is assembled with the first base block 12A by fixedly fastening the coupling columns 12Bb to the substrate portion 12Aa via bolts 16, with the coupling columns 12Bb being pressed against the substrate portion 12Aa of the first base block 12A. The fixture flange 12Ab extending radially outward from the substrate portion 12Aa of the first base block 12A has a bolt insertion hole 40 axially extending though the fixture flange 12Ab. The bolt insertion hole 40 receives therein a bolt (not shown) for fixture onto a vehicle body.

The tubular case 15 includes a case body portion 15a and an output arm 27. The case body portion 15a covers the radially outer surface of the speed reducing mechanism unit. The output arm 27 extends radially outward from the outer peripheral surface of the case body portion 15a on one side in the axial direction (opposite to the motor 8). The case body portion 15a is rotatably supported, via bearings 19, on the outer peripheral surface of the substrate portion 12Aa of the first base block 12A and the outer peripheral surface of the substrate portion 12Ba of the second base block 12B. The output arm 27 is formed integrally with the case body portion 15a by casting or the like. The output arm 27 is shaped like a prism, for example.

A seal member 28 for tightly closing the gap between the substrate portion 12Aa and the case body portion 15a is disposed between the outer peripheral surface of the substrate portion 12Aa of the first base block 12A and the inner peripheral surface of the case body portion 15a on one side in the axial direction. The seal member 28 is positioned on the axially outer side relative to one of the bearings 19 positioned on one side in the axial direction. Likewise, another seal member 28 for tightly closing the gap between the substrate portion 12Ba and the tubular case 15 is disposed between the outer peripheral surface of the substrate portion 12Ba of the second base block 12B and the inner peripheral surface of the case body portion 15a on the other side in the axial direction. The other seal member 28 is positioned on the axially outer side relative to the other of the bearings 19 positioned on the other side in the axial direction. The space delineated by the tubular case 15 and the base block 12 is filled with a lubricant liquid for lubricating mechanical parts such as the speed reducing mechanism unit.

The crankshafts 13 serving as the input rotating bodies are arranged on the same circumference centered at the central axis O1 of the first and second base blocks 12A and 12B. Each of the crankshafts 13 is rotatably supported by the substrate portion 12Aa of the first base block 12A and the substrate portion 12Ba of the second base block 12B via the bearings 22. Each crankshaft 13 includes a pair of journals 13a separated from each other in the axial direction. The journals 13a are supported on the bearings 22. Each crankshaft 13 has two eccentric rotating portions 13b provided between the journals 13a. In the embodiment, the bearings 22 are tapered roller bearings. The bearings 22 are built in to supporting holes 47 of the substrate portions 12Aa, 12Ba such that the rollers contacting the inner race and the outer race are oblique radially outward so as to face the eccentric rotating portions 13b of the crankshaft 13.

On the end of the crankshaft 13 on the one side in the axial direction (the side where the motor 8 is positioned), a gear attachment portion 13c is formed adjacently to the journal 13a. The gear attachment portion 13c protrudes axially outward from the supporting hole 47 of the substrate portion 12Aa on the first base block 12A side. The gear attachment portion 13c has a crank gear 24 attached thereto, meshing with an output gear 23 of the motor 8 and a gear of a gear mechanism (not shown) formed on the steering shaft 3 (see FIG. 1).

In the supporting hole 47 of the substrate portion 12Aa, a metal powder detecting sensor 48 for detecting metal powder mixed in the lubricant liquid in the speed reducer 611 is mounted at the position adjacent to and axially outside (the motor 8 side of) the supporting portion supporting the bearing 22. The metal powder detecting sensor 48 is mounted in the supporting hole 47 at the position axially opposite to the eccentric rotating portion 13b with respect to the bearing 22. The metal powder detecting sensor 48 is disposed in the space between a mounting surface of the supporting hole 47 and the outer peripheral surface of the journal 13a of the crankshaft 13. The metal powder detecting sensor 48 is fixed to the substrate portion 12Aa by press-fitting into the supporting hole 47 or screwing.

The metal powder detecting sensor 48 includes, for example, an iron powder attracting portion formed of a permanent magnet, and a sensing element for sensing the amount of the iron powder attracted by the magnetic force of the permanent magnet from the change of electric resistance in a circuit. The iron powder attracting portion is disposed in a gap 48b provided in a sensor block 48a. The gap 48b allows the lubricant liquid to flow therethrough. The above structure of the metal powder detecting sensor 48 is not limitative, and the metal powder detecting sensor 48 can have any other structure capable of sensing the amount of iron powder in the lubricant liquid.

The metal powder detecting sensor 48 is electrically connected to an input portion of a controller (not shown). The controller determines whether or not the amount of the metal powder mixed into the lubricant liquid in the speed reducer 611 is equal to or larger than a predetermined amount, based on a sensing signal from the metal powder detecting sensor 48. When determining that the amount of the metal powder mixed is equal to or larger than a predetermined amount, the controller puts on an alert indication for example, to inform a user that the timing for maintenance such as replacement of the lubricant liquid has been reached.

As described above, in the speed reducer 611 of the embodiment, the output arm 27 extending radially outward from the outer peripheral surface of the tubular case 15 is integrated with the tubular case 15. Therefore, it is possible to output a stable torque through the output arm 27 to the outside without enlargement of the size or weight of the speed reducer 611 as a whole or increase of the amount of production work, unlike the case where a fixing flange is provided on the tubular case 15 and an output arm formed separately is bolted to this flange (the conventional structure).

In the speed reducer 611 of the embodiment, the metal powder detecting sensor 48 for detecting the metal powder mixed into the lubricant liquid is disposed at a position axially distant from the speed reducing mechanism unit (the first and second oscillating gears 14A, 14B). Therefore, the amount of the metal powder mixed into the lubricant liquid can be sensed at a position distant from the region in which the lubricant liquid is stirred widely by the operation of the speed reducing mechanism unit. The speed reducer 611 of the embodiment is capable of solving the problem that an accurate amount of the metal powder cannot be sensed due to the lubricant liquid being stirred widely by the operation of the speed reducing mechanism unit. The speed reducer 611 of the embodiment is capable of sensing an accurate amount of the metal powder mixed even when the lubricant liquid is stirred differently depending on the difference in the specification of the speed reducer 611.

In particular, in the speed reducer 611 of the embodiment, since the metal powder detecting sensor 48 is disposed in the vicinity of the journal 13a of the crankshaft 13, this sensor is also less prone to be affected by the stirring of the lubricant liquid caused by the operation of the eccentric rotating portion 13b of the crankshaft 13.

Further, in the speed reducer 611 of the embodiment, the metal powder detecting sensor 48 is fixed to the inside of the supporting hole 47 of the substrate portion 12Aa that supports the journal 13a. Therefore, there is no need of providing a fixture flange or the like for mounting the metal powder detecting sensor 48 on the substrate portion 12Aa side of the base block 12. Accordingly, the speed reducer 611 of the embodiment can have a simple structure, and this facilitates the production work.

The following lists other modifications that can be derived from the above-described seventh embodiment. Stated differently, the seventh embodiment includes the following modifications.

(6-1) A speed reducer including:
    a base block (for example, the base block 12);
    an input rotating body (for example, the crankshaft 13)
        rotatably supported on the base block and configured to rotate when acted upon by power from a drive device (for example, the motor 8);
a speed reducing mechanism unit (for example, the first and second oscillating gears 14A and 14B and the inner tooth pins 21) for reducing a speed of rotation of the input rotating body;
a tubular case (for example, the tubular case 115) covering an outer surface of the speed reducing mechanism unit and configured to rotate when acted upon by speed-reduced power from the speed reducing mechanism unit; and
a metal powder detecting sensor (for example, the metal powder detecting sensor 48) for detecting metal powder in a lubricant liquid filled in a space delineated by the tubular case and the base block,
wherein the metal powder detecting sensor is disposed at a position distant from the speed reducing mechanism unit in the axial direction, the position being close to a bearing portion (for example, the journal 13*a*) of the input rotating body.

(6-2) A speed reducer including:
a base block (for example, the base block 12);
a crankshaft (for example, the crankshaft 13) including an eccentric rotating portion and rotatably supported on the base block, the crankshaft being configured to receive power input from a drive device (for example, the motor 8);
an oscillating gear (for example, the first and second oscillating gears 14A, 14B) having outer teeth on an outer periphery thereof and configured to rotate oscillatorily when acted upon by an eccentric rotational force from the eccentric rotating portion;
a tubular case (for example, the tubular case 15) having inner teeth (for example, the inner tooth pins 21) the number of which is different from the number of the outer teeth, the tubular case being rotatably supported on the base block and configured to rotate in mesh with the outer teeth; and
a metal powder detecting sensor (for example, the metal powder detecting sensor 48) for detecting metal powder in a lubricant liquid filled in a space delineated by the tubular case and the base block,
wherein the metal powder detecting sensor is disposed at a position close to a journal (for example, the journal 13*a*) of the crankshaft.

(6-3) The speed reducer as set forth in (6-2),
wherein the base block has a supporting hole (for example, the supporting hole 47) supporting the journal via a bearing (for example, the bearing 22), and
wherein the metal powder detecting sensor is fixed within the supporting hole.

(6-4) A drive unit including:
a drive device for outputting rotational power; and
a speed reducer for reducing a speed of input rotation when acted upon by power fed from the drive device,
wherein the speed reducer includes:
a base block;
an input rotating body rotatably supported on the base block and configured to rotate when acted upon by power from the drive device;
a speed reducing mechanism unit for reducing a speed of rotation of the input rotating body;
a tubular case covering an outer surface of the speed reducing mechanism unit and configured to rotate when acted upon by speed-reduced power from the speed reducing mechanism unit; and
a metal powder detecting sensor for detecting metal powder in a lubricant liquid filled in a space delineated by the tubular case and the base block, and
wherein the metal powder detecting sensor is disposed at a position distant from the speed reducing mechanism unit in the axial direction, the position being close to a bearing portion of the input rotating body.

(6-5) A steering assisting device including:
a drive device for outputting rotational power;
a speed reducer for reducing a speed of input rotation when acted upon by power fed from the drive device; and
a steering mechanism operable when acted upon by speed-reduced power from the speed reducer,
wherein the speed reducer includes:
a base block;
an input rotating body rotatably supported on the base block and configured to rotate when acted upon by power from the drive device;
a speed reducing mechanism unit for reducing a speed of rotation of the input rotating body;
a tubular case covering an outer surface of the speed reducing mechanism unit and configured to rotate when acted upon by speed-reduced power from the speed reducing mechanism unit; and
a metal powder detecting sensor for detecting metal powder in a lubricant liquid filled in a space delineated by the tubular case and the base block, and
wherein the metal powder detecting sensor is disposed at a position distant from the speed reducing mechanism unit in the axial direction, the position being close to a bearing portion of the input rotating body.

Eighth Embodiment

Figure 19:
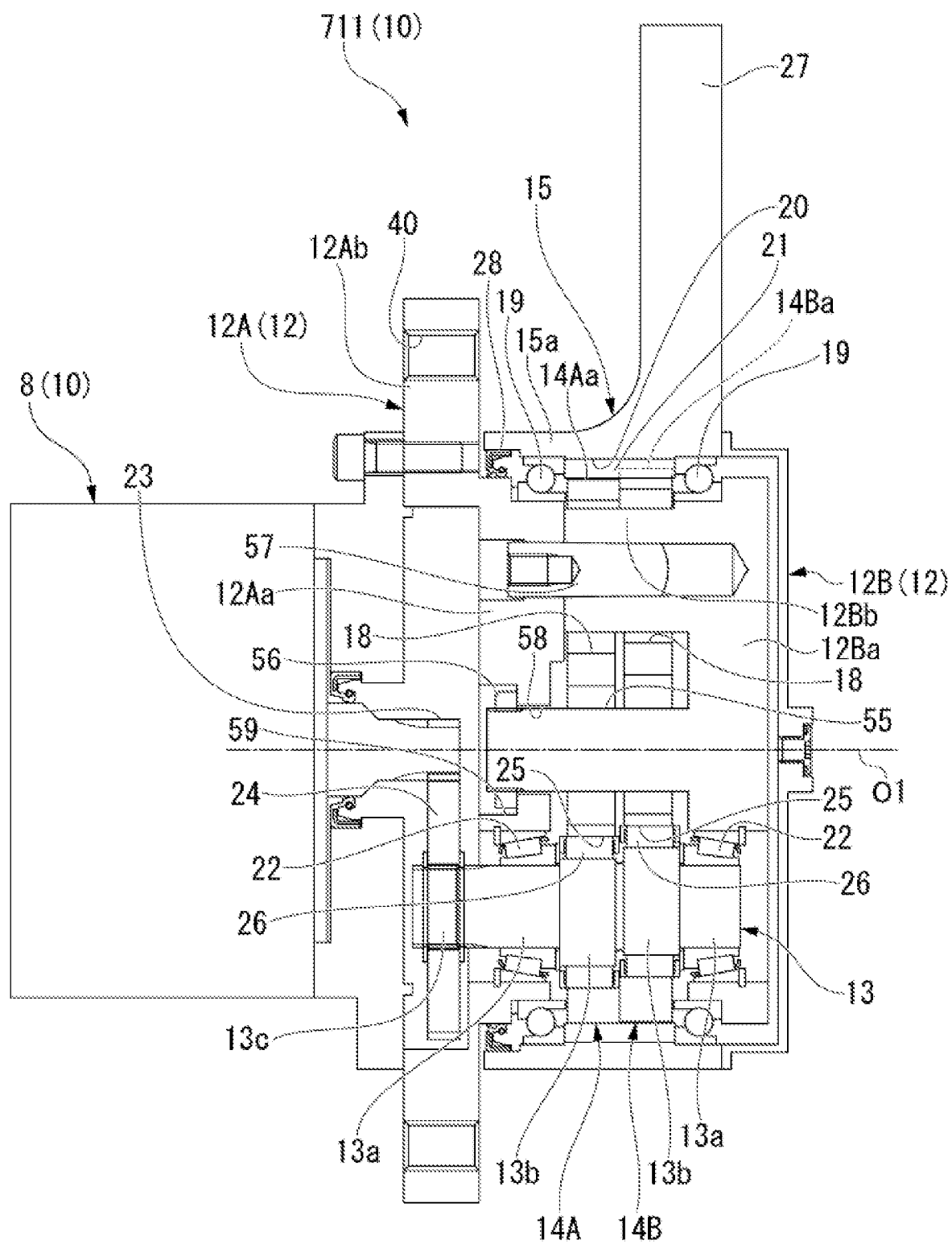
FIG. 19 is a longitudinal sectional view of a drive unit according to an eighth embodiment.

FIG. 19 is a longitudinal sectional view of the drive unit 10 including a speed reducer 711 according to an eighth embodiment. The speed reducer 711 relating to the present embodiment includes a base block 12 fixedly provided in a vehicle, a plurality of crankshafts 13 (input rotating body) rotatably supported on the base block 12, a first oscillating gear 14A and a second oscillating gear 14B configured to rotate oscillatorily when acted upon by the rotation of the crankshafts 13, and a tubular case 15 covering the radially outer surface of the first and second oscillating gears 14A and 14B. In the inner peripheral surface of the tubular case 15, pin grooves 20 are formed. The pin grooves 20 retain the inner tooth pins 21 therein. The inner tooth pins 21 constitute the speed reducing mechanism unit when combined with the first and second oscillating gears 14A and 14B. The foregoing basic configuration of the present embodiment is the same as that of the first embodiment.

The base block 12 includes a first base block 12A positioned on one side in the axial direction and a second base block 12B positioned on the other side in the axial direction. The first base block 12A includes a substrate portion 12Aa and a fixture flange 12Ab. The substrate portion 12Aa is shaped like a disc, and the fixture flange 12Ab is bent in a crank-like manner from the outer peripheral portion of the substrate portion 12Aa toward the axially outer side and then projects toward the radially outer side. The second base block 12B includes a substrate portion 12Ba and a plurality of coupling columns 12Bb. The substrate portion 12Ba is shaped like a disc and has substantially the same outer diameter as the substrate portion 12Aa of the first base block 12A. The coupling columns 12Bb extend from the end surface of the substrate portion 12Ba toward the substrate portion 12Aa of the first base block 12A. On the end surface of the substrate portion 12Ba, the plurality of (for example, three) coupling columns 12Bb are concentrically arranged and centered on the central axis O1.

The second base block 12B is fixed to the first base block 12A by fitting the coupling columns 12Bb via tapered pins 57, with the end surfaces of the coupling columns 12Bb being pressed against the end surface of the substrate portion 12Aa of the first base block 12A. The tapered pins 57 are fitted into the substrate portion 12Aa and the coupling columns 12Bb from the substrate portion 12Aa side of the first base block 12A.

The first and second oscillating gears 14A and 14B each have a plurality of relief holes 18 formed therein, which are penetrated by the coupling columns 12Bb of the first base block 12A. The relief holes are sufficiently larger than the outer diameter of the coupling columns 12Bb, so that the coupling columns 12Bb do not prevent the oscillatory rotation of the first and second oscillating gears 14A and 14B.

In the radially central position of the substrate portion 12Ba of the second base block 12B, a coupling shaft 55 is formed to extend toward the substrate portion 12Aa of the first base block 12A. The coupling shaft 55 has a larger diameter than the tapered pins 57 fitted into the coupling columns 12Bb. On the other hand, in the radially central position of the substrate portion 12Aa of the first base block 12A, there are formed an insertion hole 58 into which the distal end portion of the coupling shaft 55 is inserted, and a recess 59 having a substantially circular shape and containing the distal end portion of the coupling shaft 55 penetrating the insertion hole 58. In the recess 59, a nut 56 is screwed on the distal end portion of the coupling shaft 55 penetrating the insertion hole 58. The nut 56, which is screwed on the distal end portion of the coupling shaft 55, fixes the first base block 12A and the second base block 12B in the axial direction. The nut 56 should preferably have an anti-loosening feature. In the embodiment, the nut 56 constitutes a retaining member.

The tubular case 15 includes a case body portion 15a and an output arm 27. The case body portion 15a covers the radially outer surface of the speed reducing mechanism unit. The output arm 27 extends radially outward from the outer peripheral surface of the case body portion 15a on one side in the axial direction (opposite to the motor 8). The case body portion 15a is rotatably supported, via bearings 19, on the outer peripheral surface of the substrate portion 12Aa of the first base block 12A and the outer peripheral surface of the substrate portion 12Ba of the second base block 12B. The output arm 27 is formed integrally with the case body portion 15a by casting or the like. The output arm 27 is shaped like a prism, for example.

As described above, in the speed reducer 711 of the embodiment, the output arm 27 extending radially outward from the outer peripheral surface of the tubular case 15 is integrated with the tubular case 15. Therefore, it is possible to output a stable torque through the output arm 27 to the outside without enlargement of the size or weight of the speed reducer 711 as a whole or increase of the amount of production work, unlike the case where a fixing flange is provided on the tubular case 15 and an output arm formed separately is bolted to this flange (the conventional structure).

In the speed reducer 711 of the embodiment, the first base block 12A and the second base block 12B are fixed together in the axial direction by the coupling shaft 55 penetrating the substrate portion 12Aa of the first base block 12A and the nut 56 screwed on the distal end portion of the coupling shaft 55. In addition, the plurality of coupling columns 12Bb projecting from the second base block 12B are coupled to the substrate portion 12Aa of the first base block 12A by the tapered pins 57. In this way, the first base block 12A and the second base block 12B are fixed together in the rotational direction.

Therefore, in the speed reducer 711 of the embodiment, the fixing (displacement restraint) in the axial direction and the fixing (displacement restraint) in the rotational direction are accomplished on the first base block 12A and the second base block 12B by the coupling shaft 55 and the nut 45 positioned at the center and the plurality of tapered pins 57 coupled to the coupling columns 12Bb, respectively. Accordingly, the speed reducer 711 of the embodiment is capable of downsizing the outer shape of the coupling columns 12Bb and reducing the number of parts required for fixing, as compared to the case where the coupling columns 12Bb and the second base block are coupled by a plurality of bolts. Further, since the outer shape of the coupling columns 12Bb can be downsized, the relief holes 18 formed in the first oscillating gear 14A and the second oscillating gear 14B can have a small size. Accordingly, the durability of the oscillating gears 14A, 14B can be improved.

The following lists other modifications that can be derived from the above-described eighth embodiment. Stated differently, the eighth embodiment includes the following modifications.

(7-1) A speed reducer including:
- a first base block (for example, the first base block 12A) and a second base block (for example, the second base block 12B) coupled with each other at a plurality of portions around a central axis via coupling columns (for example, the coupling columns 12Bb);
- an oscillating gear having relief holes penetrated by the coupling columns, the oscillating gear being supported on the first base block and the second base block so as to be oscillatorily rotatable; and
- a tubular case configured to receive speed-reduced rotation from the oscillating gear,
- wherein the first base block and the second base block are fixed together in the axial direction by a coupling shaft and a retaining member, the coupling shaft projecting from a radially central position of one of these base blocks and penetrating the other base block, the retaining member being fixed to the coupling shaft penetrating the other base block,
- wherein the coupling columns are formed integrally with any one of the first base block and the second base block, and
- wherein distal end portions of the coupling columns are fixed to the other of the first base block and the second base block by fitting with pins (for example, the tapered pins 57).

(7-2) A speed reducer including:
- a first base block (for example, the first base block 12A) and a second base block (for example, the second base block 12B) coupled with each other at a plurality of portions around a central axis via coupling columns (for example, the coupling columns 12Bb);
- a crankshaft (for example, the crankshaft 13) including an eccentric rotating portion (for example, the eccentric rotating portion 13b) and rotatably supported on the first base block and the second base block, the crankshaft being configured to receive power input from a drive device (for example, the motor 8);
- an oscillating gear (for example, the first and second oscillating gears 14A, 14B) having relief holes (for example, the relief holes 18) penetrated by the coupling columns and having outer teeth (for example, the outer teeth 14Aa, 14Ba) on an outer periphery thereof, the oscillating gear being configured to rotate oscillatorily when acted upon by an eccentric rotational force from the eccentric rotating portion; and a tubular case (for example, the tubular case 15) having inner teeth (for example, the inner tooth pins 21) the number of which is different from the number of the outer teeth, the tubular case being rotatably supported on the base block and configured to rotate in mesh with the outer teeth, wherein the first base block and the second base block are fixed together in the axial direction by a coupling shaft (for example the coupling shaft 55) and a retaining member (for example, the nut 56), the coupling shaft projecting from a radially central position of one of these base blocks and penetrating the other base block, the retaining member being fixed to the coupling shaft penetrating the other base block, wherein the coupling columns are formed integrally with any one of the first base block and the second base block, and wherein distal end portions of the coupling columns are fixed to the other of the first base block and the second base block by fitting with pins (for example, the tapered pins 57).

(7-3) A drive unit including:

a drive device for outputting rotational power; and a speed reducer for reducing a speed of input rotation when acted upon by power fed from the drive device, wherein the speed reducer includes:
- a first base block and a second base block coupled with each other at a plurality of portions around a central axis via coupling columns;
- an oscillating gear having relief holes penetrated by the coupling columns, the oscillating gear being supported on the first base block and the second base block so as to be oscillatorily rotatable; and
- a tubular case configured to receive speed-reduced rotation from the oscillating gear, wherein the first base block and the second base block are fixed together in the axial direction by a coupling shaft and a retaining member, the coupling shaft projecting from a radially central position of one of these base blocks and penetrating the other base block, the retaining member being fixed to the coupling shaft penetrating the other base block, wherein the coupling columns are formed integrally with any one of the first base block and the second base block, and wherein distal end portions of the coupling columns are fixed to the other of the first base block and the second base block by fitting with pins.

(7-4) A steering assisting device including:

a drive device for outputting rotational power;

a speed reducer for reducing a speed of input rotation when acted upon by power fed from the drive device; and a steering mechanism operable when acted upon by speed-reduced power from the speed reducer, wherein the speed reducer includes:
- a first base block and a second base block coupled with each other at a plurality of portions around a central axis via coupling columns;
- an oscillating gear having relief holes penetrated by the coupling columns, the oscillating gear being supported on the first base block and the second base block so as to be oscillatorily rotatable; and
- a tubular case configured to receive speed-reduced rotation from the oscillating gear, wherein the first base block and the second base block are fixed together in the axial direction by a coupling shaft and a retaining member, the coupling shaft projecting from a radially central position of one of these base blocks and penetrating the other base block, the retaining member being fixed to the coupling shaft penetrating the other base block, wherein the coupling columns are formed integrally with any one of the first base block and the second base block, and wherein distal end portions of the coupling columns are fixed to the other of the first base block and the second base block by fitting with pins.

The present invention is not limited to the above-described embodiments but can be modified in a variety of designs without deviating from the spirit of the present invention.

INDUSTRIAL APPLICABILITY

According to the present disclosure, it is possible to output a stable torque through the output arm to the outside without enlargement of the size or weight of the device as a whole or increase of the amount of production work. Therefore, the present invention has industrial applicability.

What is claimed is:

1. A speed reducer comprising:
a crank gear meshing with an output gear of a drive device;
an input rotating body attached to the crank gear, the input rotating body being rotatable when acted upon by power fed from the drive device, the input rotating body including a pair of journals, a first eccentric rotating portion, and a second eccentric rotating portion, the pair of the journals being concentrically disposed on the crank gear, the first eccentric rotating portion and the second eccentric rotating portion being provided between the pair of the journals;
a speed reducing mechanism unit for reducing a speed of rotation of the input rotating body, the speed reducing mechanism unit including a first eccentric portion bearing, a second eccentric portion bearing, a first oscillating gear, and a second oscillating gear, the first oscillating gear being supported on the first eccentric rotating portion via the first eccentric portion bearing, the second oscillating gear being supported on the second eccentric rotating portion via the second eccentric portion bearing;
a tubular case covering an outer surface of the speed reducing mechanism unit and configured to rotate when acted upon by speed-reduced power from the speed reducing mechanism unit; and
a base block including a fixture flange, the fixture flange being fixed to a case of the drive device, the base block rotatably supporting the input rotating body and the tubular case,
wherein an output arm is formed integrally with the tubular case, the output arm extending radially outward from an outer peripheral surface of the tubular case and configured to transmit a manipulating force to an outside.

2. The speed reducer of claim 1, wherein the fixture flange projects radially outward from a position adjacent to one end portion of the tubular case in an axial direction and fixed to a member different from the speed reducer, and
  wherein the output arm extends radially outward from another end portion of the tubular case in the axial direction.

3. A drive unit comprising:
  a drive device for outputting rotational power, the drive device including an output gear and a case; and
  a speed reducer for reducing a speed of input rotation when acted upon by power fed from the drive device,
  wherein the speed reducer includes:
    a crank gear meshing with the output gear of the drive device;
    an input rotating body attached to the crank gear, the input rotating body being rotatable when acted upon by power fed from the drive device, the input rotating body including a pair of journals, a first eccentric rotating portion, and a second eccentric rotating portion, the pair of the journals being concentrically disposed on the crank gear, the first eccentric rotating portion and the second eccentric rotating portion being provided between the pair of the journals;
    a speed reducing mechanism unit for reducing a speed of rotation of the input rotating body, the speed reducing mechanism unit including a first eccentric portion bearing, a second eccentric portion bearing, a first oscillating gear, and a second oscillating gear, the first oscillating gear being supported on the first eccentric rotating portion via the first eccentric portion bearing, the second oscillating gear being supported on the second eccentric rotating portion via the second eccentric portion bearing;
    a tubular case covering an outer surface of the speed reducing mechanism unit and configured to rotate when acted upon by speed-reduced power from the speed reducing mechanism unit; and
    a base block including a fixture flange, the fixture flange being fixed to a case of the drive device, the base block rotatably supporting the input rotating body and the tubular case,
  wherein an output arm is formed integrally with the tubular case, the output arm extending radially outward from an outer peripheral surface of the tubular case and configured to transmit a manipulating force to an outside.

4. A steering assisting device comprising:
  a drive device for outputting rotational power, the drive device including an output gear and a case;
  a speed reducer for reducing a speed of input rotation when acted upon by power fed from the drive device; and
  a steering mechanism operable when acted upon by speed-reduced power from the speed reducer,
  wherein the speed reducer includes:
    a crank gear meshing with the output gear of the drive device;
    an input rotating body attached to the crank gear, the input rotating body being rotatable when acted upon by power fed from the drive device, the input rotating body including a pair of journals, a first eccentric rotating portion, and a second eccentric rotating portion, the pair of the journals being concentrically disposed on the crank gear, the first eccentric rotating portion and the second eccentric rotating portion being provided between the pair of the journals;
    a speed reducing mechanism unit for reducing a speed of rotation of the input rotating body, the speed reducing mechanism unit including a first eccentric portion bearing, a second eccentric portion bearing, a first oscillating gear, and a second oscillating gear, the first oscillating gear being supported on the first eccentric rotating portion via the first eccentric portion bearing, the second oscillating gear being supported on the second eccentric rotating portion via the second eccentric portion bearing; and
    a tubular case covering an outer surface of the speed reducing mechanism unit and configured to rotate when acted upon by speed-reduced power from the speed reducing mechanism unit; and
    a base block including a fixture flange, the fixture flange being fixed to a case of the drive device, the base block rotatably supporting the input rotating body and the tubular case,
  wherein an output arm is formed integrally with the tubular case, the output arm extending radially outward from an outer peripheral surface of the tubular case and configured to transmit a manipulating force to the steering mechanism.

\* \* \* \* \*